(12) United States Patent
Chung et al.

(10) Patent No.: US 9,788,072 B2
(45) Date of Patent: *Oct. 10, 2017

(54) PROVIDING A SEARCH SERVICE CONVERTIBLE BETWEEN A SEARCH WINDOW AND AN IMAGE DISPLAY WINDOW

(71) Applicant: SAMSUNG ELECTRONICS CO., LTD., Suwon-si (KR)

(72) Inventors: Ji-hye Chung, Seoul (KR); Hye-jeong Lee, Seoul (KR); Eun-young Lim, Seoul (KR); Ji-sun Yang, Incheon (KR); Seung-soo Kang, Uijeongbu-si (KR); Sin-oug Yeo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/719,950

(22) Filed: May 22, 2015

(65) Prior Publication Data

US 2015/0256894 A1 Sep. 10, 2015

Related U.S. Application Data

(63) Continuation of application No. 13/224,867, filed on Sep. 2, 2011, now Pat. No. 9,066,137.

(30) Foreign Application Priority Data

Sep. 2, 2010 (KR) .................. 10-2010-0086155

(51) Int. Cl.
*G06F 3/048* (2013.01)
*H04N 21/482* (2011.01)
(Continued)

(52) U.S. Cl.
CPC ....... *H04N 21/4828* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 6,184,877 B1 2/2001 Dodson et al.
7,689,933 B1 3/2010 Parsons
(Continued)

FOREIGN PATENT DOCUMENTS

EP 0 848 554 A2 6/1998
EP 1 111 926 A2 6/2001
(Continued)

OTHER PUBLICATIONS

Office Action dated Nov. 23, 2015, issued by the United States Patent and Trademark Office in U.S. Appl. No. 13/219,234.
(Continued)

*Primary Examiner* — Asher Kells
(74) *Attorney, Agent, or Firm* — Sughrue Mion, PLLC

(57) ABSTRACT

A method for providing a search service and a display apparatus applying the same are provided. According to the search service providing method, a search window for doing an Internet search is displayed on a partial area of the screen that displays an image. The search window can be converted into an image display window in response to receiving a specific manipulation input by a user, thereby allowing the user to use the search service while converting between the use of the search window and video watching.

18 Claims, 40 Drawing Sheets

(51) Int. Cl.
 *H04N 21/443* (2011.01)
 *H04N 21/4782* (2011.01)
 *H04N 21/485* (2011.01)
 *G06F 17/30* (2006.01)
 *G06F 3/0482* (2013.01)
 *G06F 3/0484* (2013.01)
 *H04N 21/472* (2011.01)
 *H04N 21/61* (2011.01)

(52) U.S. Cl.
 CPC .. *G06F 17/30554* (2013.01); *G06F 17/30864* (2013.01); *H04N 21/4438* (2013.01); *H04N 21/4782* (2013.01); *H04N 21/47202* (2013.01); *H04N 21/4858* (2013.01); *H04N 21/6125* (2013.01)

(56) References Cited

U.S. PATENT DOCUMENTS

| | | |
|---|---|---|
| 7,873,622 B1 | 1/2011 | Karls et al. |
| 8,260,795 B2 | 9/2012 | Park et al. |
| 8,341,143 B1 | 12/2012 | Karls et al. |
| 2002/0056083 A1 | 5/2002 | Istvan |
| 2003/0197744 A1 | 10/2003 | Irvine |
| 2004/0001104 A1 | 1/2004 | Sommerer et al. |
| 2006/0130109 A1 | 6/2006 | Zenith |
| 2007/0058047 A1 | 3/2007 | Henty |
| 2007/0198476 A1 | 8/2007 | Farago et al. |
| 2007/0244902 A1 | 10/2007 | Seide et al. |
| 2008/0147632 A1 | 6/2008 | Couch et al. |
| 2008/0147653 A1 | 6/2008 | Collier |
| 2009/0150379 A1 | 6/2009 | Park et al. |
| 2010/0162164 A1 | 6/2010 | Kwon et al. |
| 2010/0201700 A1 | 8/2010 | Kusumoto et al. |
| 2010/0242064 A1* | 9/2010 | Dasher ............... H04N 7/17336 725/34 |
| 2011/0173569 A1 | 7/2011 | Howes et al. |
| 2011/0289530 A1 | 11/2011 | Dureau et al. |
| 2012/0047134 A1 | 2/2012 | Hansson et al. |

FOREIGN PATENT DOCUMENTS

| | | |
|---|---|---|
| JP | 2010-185957 A | 8/2010 |
| KR | 1998-063435 A | 10/1998 |
| KR | 10-2009-0059923 A | 6/2009 |
| KR | 10-2010-0037911 A | 4/2010 |

OTHER PUBLICATIONS

Communication dated Mar. 27, 2014 issued by the European Patent Office in counterpart European Patent Application No. 11179785.8.
USPTO Office Action dated Jul. 31, 2015 issued in co-pending U.S. Appl. No. 13/219,234.
Communication from the European Patent Office issued Aug. 28, 2015 in a counterpart European Application No. 11179785.8.
Communication issued Jun. 27, 2016, issued by the Korean Intellectual Property Office in counterpart Korean Patent Application No. 10-2010-0086155.
Communication issued Aug. 11, 2016, issued by the Korean Intellectual Property Office in counterpart Korean Patent Application No. 10-2010-0085097.

* cited by examiner

PROVIDING A SEARCH SERVICE CONVERTIBLE BETWEEN A SEARCH WINDOW AND AN IMAGE DISPLAY WINDOW

CROSS-REFERENCE TO RELATED APPLICATION

This application is a continuation application of U.S. patent application Ser. No. 13/224,867, filed Sep. 2, 2011 in the United States Patent and Trademark Office, which claims priority from Korean Patent Application No. 10-2010-0086155, filed on Sep. 2, 2010, in the Korean Intellectual Property Office, the disclosures of which are incorporated herein by reference in their entirety.

BACKGROUND

1. Field

Methods and apparatuses consistent with exemplary embodiments relate to a method for providing a search service and a display apparatus applying the same, and more particularly, to a method for providing a search service and a display apparatus applying the same, which are adapted to provide an Internet search service in the display apparatus.

2. Description of the Related Art

The technology of providing services through the Internet as well as receiving broadcasts has been adopted to a television (TV). For example, Internet protocol television (IPTV) can execute applications, such as widgets, while connected to the Internet.

The related art TV may be equipped with a web browser to provide an Internet service. In this case, a user has to execute the web browser by pressing a particular button of the remote control to access the web browser, or execute the web browser through a menu choice.

However, when using the Internet on a TV, the user cannot concentrate their attention on the TV screen, because the TV screen is obscured by the Internet web browser. Moreover, the related art TV lacks the user interface that would be required to use the Internet web browser. Thus, the user may feel that it is inconvenient to use the web browser on the TV.

In particular, it may be difficult for the user to enter text using the related art remote control of the TV, making it inconvenient for the user to do an Internet search with the TV. In addition, the user cannot watch the related art TV in a normal mode of operation when doing an Internet search with the TV.

Users want a display apparatus that enables the users to use a search service more easily with a web browser as compared with the related art. Accordingly, there is a need to find a solution to allow a user to do a search more easily.

SUMMARY

One or more exemplary embodiments provide a method for providing a search service and a display apparatus applying the same, which displays a search window performing an Internet search on a partial area of a screen on which an image is displayed, and upon receiving a specific manipulation input by a user, converts the search window into an image display window.

According to an aspect of an exemplary embodiment, there is provided a method for providing a search service, the method including: displaying a search window for doing an Internet search on a partial area of a screen; and upon receiving a specific manipulation input by a user, converting the search window into an image display window for displaying the image on the partial area of the screen, wherein the image display window is made to correspond to a window for displaying an image on a partial area of the screen.

The search window may be a window that is displayed by an application for performing an Internet search based on keyword input, and the search window may include a search keyword input region for inputting a search keyword by a user and a search result display region for displaying a search result.

The search window may be displayed in a first mode for displaying only one result in the search result display region and a second mode for displaying a plurality of results in the search result display region, and, in displaying search results based on an increased number of result displays on the search window, the search window may be converted from the first mode into the second mode.

The first manipulation may correspond to a manipulation in which a command is entered more than a particular number of times to turn search results displayed in the search result display region into units of the number of search displays.

The search window may further include a third mode for displaying a displayable mode in full screen, and, upon receiving a second manipulation input by the user when the search window is displayed in the second mode, the search window may be converted from the second mode into the third mode.

The second manipulation may correspond to a manipulation for changing the size of the search window to more than half of the full screen size.

The method may further include, when the search window has been converted to the third mode, displaying the window that displays the image on a partial area of the screen.

The method may further include bookmarking at least one of the entries included in the search results.

The method may further include, upon receiving a third manipulation input by the user, displaying as many bookmarked entries as a preset number of result displays, among the search results, on the search window.

According to an aspect of another exemplary embodiment, there is provided a display apparatus, which includes: a display unit that displays an image; and a controller that controls a search window for doing an Internet search to be displayed on a partial area of the screen of the display unit and, upon receiving a specific manipulation input by a user, converts the search window into an image display window for displaying the image on a partial area of the screen, wherein the image display window corresponds to a window for displaying the image on a partial area of the screen.

The search window may be a window displayed by an application for performing an Internet search based on keyword input, and the search window may include a search keyword input region for inputting a search keyword by a user and a search result display region for displaying a search result.

The search window may be displayed in a first mode for displaying only one result in the search result display region and a second mode for displaying a plurality of results in the search result display region, and the controller may convert the search window from the first mode into the second mode.

The first manipulation may correspond to a manipulation in which a command is entered more than a particular number of times to turn search results displayed in the search result display region into units of the number of search displays.

The search window may further include a third mode for displaying a displayable mode in full screen, and, upon receiving a second manipulation input by the user when the search window is displayed in the second mode, the controller may convert the search window from the second mode into the third mode.

The second manipulation may correspond to a manipulation for changing the size of the search window to more than half of the full screen size.

The controller may control such that, when the search window has been converted to the third mode, the window displaying the image is displayed on a partial area of the screen.

The controller may perform control such that at least one of the entries included in the search results is bookmarked.

The controller may perform control such that, upon receiving a third manipulation input by the user, bookmarked entries based on a preset number of result displays, among the search results, are displayed on the search window.

In accordance with an aspect of another exemplary embodiment, there is provided a computer-readable medium is configured to perform a set of operations based on a corresponding set of instructions contained in the computer-readable medium. The instructions include displaying a search window configured for an Internet search on a partial area of a screen, and upon receiving a specific manipulation input by a user, converting the search window into an image display window for displaying the image on the partial area of the screen. The image display window corresponds to a window for displaying an image on a partial area of the screen.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
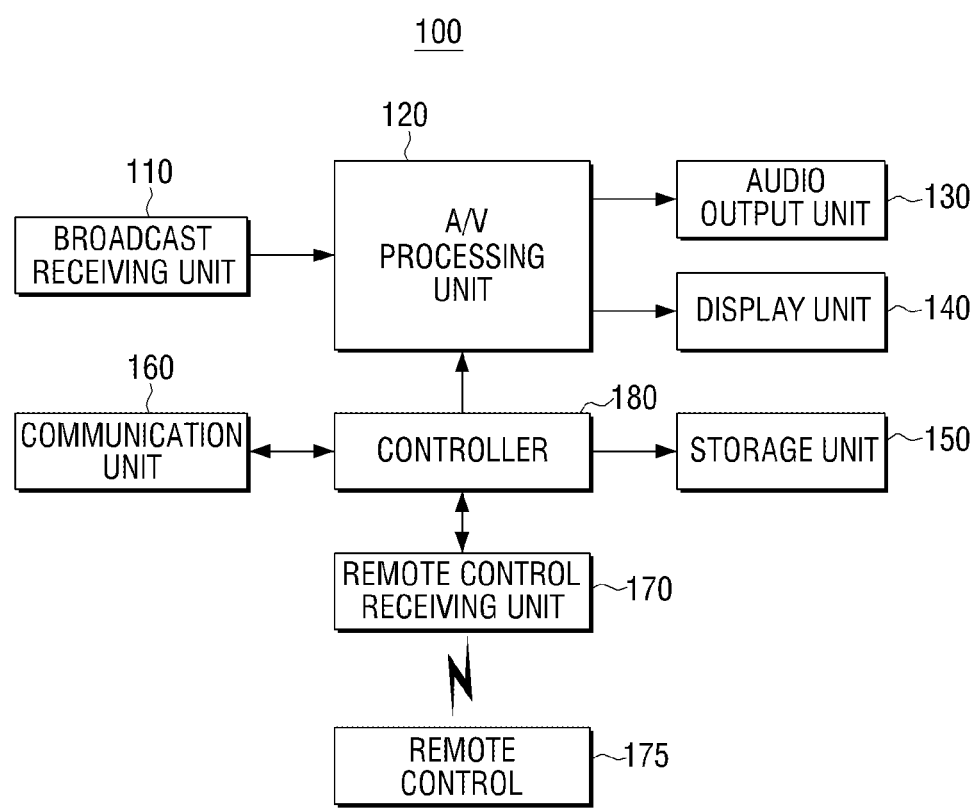
FIG. 1 is a block diagram illustrating a detailed configuration of a TV 100 according to one exemplary embodiment.

Hereinafter, exemplary embodiments will be described in greater detail with reference to the accompanying drawings. Various changes, modifications, and equivalents of the systems, apparatuses and/or methods described herein will suggest themselves to those of ordinary skill in the art. Descriptions of well-known functions and structures are omitted to enhance clarity and conciseness. Elements, features, and structures are denoted by the same reference numerals throughout the drawings and the detailed description. The size and proportions of some elements may be exaggerated in the drawings for clarity and convenience. The term "unit" as used herein may include a hardware component and/or a software component that is executed by a hardware processor.

FIG. 1 is a block diagram illustrating a detailed configuration of a display apparatus 100 according to an exemplary embodiment. The display apparatus may be embodied as a TV. The display apparatus 100 comprises a broadcast receiving unit 110, an audio/video (A/V) processing unit 120, an audio output unit 130, a display unit 140, a storage unit 150, a communication unit 160, a remote control receiving unit 170, and a controller 180.

The broadcast receiving unit 110 receives a broadcast via a wired or wireless connection from a broadcasting station or satellite, and demodulates the received broadcast. The broadcast receiving unit 110 may receive broadcast information.

The broadcast receiving unit 110 separates the received signals into an image signal and an audio signal and transmits the image signal to the A/V processing unit 120.

The A/V processing unit 120 performs signal processing, such as video decoding, video scaling, or audio decoding, on the image signal and the audio signal input from the A/V processing unit 120. The A/V processing unit 120 outputs the image signal to the display unit 140, and outputs the audio signal to the audio output unit 130.

The audio output unit 130 outputs audio output received from the A/V processing unit 120 through a speaker, or outputs the audio to external devices (for example, an external speaker) connected through external output terminals.

The display unit 140 displays an image output from the A/V processing unit 130 on a screen. That is, the display unit 140 displays a broadcast image corresponding to a broadcast signal.

Moreover, the display unit 140 may display a search window on a partial area of the screen. The search window corresponds to a window provided to perform a simple Internet information search. That is, the search window is a window that is displayed by an application for performing an Internet search based on keyword input. The search window functions to search various Internet sites and information that can be searched via the Internet and displays search results.

The search window includes a search keyword input region for inputting a search keyword by a user and a search result display region for displaying a search result. The search window has three modes: a first mode; a second mode; and a third mode.

The first mode is a mode in which the search window is minimized. The search window in the first mode displays search results one by one on the search result display region. Since the first mode is a mode in which the search window is minimized, the user can concentrate their attention on the display.

The second mode is a mode in which the search window size is larger than that in the first mode. The search window in the second mode displays two or more search result entries, because the search result display region becomes larger. The user can concentrate their attention more on search since the size of the search window in the second mode is increased.

The third mode is a mode in which the search window is displayed in full screen. Moreover, the search window in the third mode may display various information, as well as the search keyword input region and the search result display region. The search window in the third mode may be converted into a web browser.

In addition, the display unit 140 may display an image display window. The image display window is a window for displaying a broadcast image, e.g., a TV broadcast image, or input image being currently displayed in a partial area of the screen.

The storage unit 150 stores programs for operating the display apparatus 100. Moreover, the storage unit 150 may store recorded image files. The storage unit 150 may be implemented as a hard disk, a non-volatile memory, etc. but is not limited thereto, and any equivalent structure for performing the function of storing as would be understood by those skilled in the art may be used without departing from the scope of the invention.

The communication unit 160 connects the display apparatus 100 to a communication network, such as the Internet, to enable communication. Specifically, the communication unit 160 is connected to a search engine server providing an Internet search service over the communication network. Then, the communication unit 160 transmits an input keyword to the search engine server, and receives search results for the keyword.

The remote control receiving unit 170 receives a command from a remote control 175 and transmits the command to the controller 180. Specifically, the remote control receiving unit 170 receives a user's operation input from the remote control to change the size of the search window.

The controller 180 determines the user's command based on the content of the user's manipulation transmitted from the remote control 175, and controls the entire operation of the display apparatus 100 according to the user's command.

More specifically, the controller 180 controls the search window for performing an Internet search to be displayed on a partial area of the screen where an image is displayed. Then, upon receiving a specific manipulation input by the user, the controller 180 converts the search window into the image display window. At this point, the controller 180 may control the image display window to be displayed in the same size as the search window when the search window is converted into the image display window.

The specific manipulation is a manipulation that generates an event for causing the controller 180 to convert the search window into the image display window. The specific manipulation may be a manipulation that makes the search window displayed on the full screen. In this case, upon receiving a specific manipulation input, the controller 180 converts the search window on the display into the image display window. Then, the controller 180 refreshes the display of the search window on the full screen.

Moreover, the specific manipulation may refer to a manipulation for changing the size of the search window to a size greater than a preset size. In this case, upon receiving a specific manipulation input, the controller 180 converts the displayed search window into the image display window. Then, the controller 180 controls the search window to be displayed in the changed size.

The specific manipulation may refer to a manipulation that selects an icon for converting the search window to the image display window. In this case, upon receiving an input of a selection manipulation on the icon, the controller 180 converts the search window on display into the image display window.

Furthermore, the specific manipulation may refer to a touch and drag operation on the search window. Here, the touch and drag operation is touching the screen of the area where the search window is displayed, moving it in a particular direction, and dropping it. Upon receiving an input of a touch and drag operation on the search window, the controller 180 converts the search window into the image display window.

The controller 180 can convert the search window into the image display window by various manipulations. Accordingly, the user can view an image as well while doing a search on the display apparatus.

Further, the controller 180 controls such that the search window is displayed on a partial area of the screen where an image is displayed, and such that, upon receiving a search command input through the search window, as many search results as a preset number of result displays are displayed on the search window. Here, the preset number of result displays is the number of search result entries displayed at one time on the search result display region. That is, the controller 180 sets the number of search result displays to 1 when displaying the search window in the first mode.

Upon receiving a first manipulation input by the user, the controller 180 increases the number of result displays displayed on the search window. That is, the controller 180 converts the search window from the first mode to the second mode. Then, the controller 180 converts the number of search result displays from 1 to N (where N is a natural number of 2 or more).

To this end, the controller 180 increases the size of the search result display region of the search window and increases the entire size of the search window. At this point, the controller 180 determines the relative size of the search window, taking the entire size of the screen into consideration. For example, the controller 180 may determine the size of the search window of the second mode to be ⅓ the full screen size.

As used herein, the first manipulation corresponds to a manipulation in which a command is entered more a particular number of times to turn search results displayed in the search result display region in units of the number of search displays. That is, the first manipulation is a manipulation in which a command for turning the pages of search results is entered more than a particular number of times. For example but not by way of limitation, when the user has entered a command for turning over the pages of search results three times, the controller 180 may convert the search window from the first mode to the second mode on the point of time when the page turn command has been entered three times.

Frequent inputs of the page turn command by the user represent the user's intention to focus on finding desired search results. Therefore, when the user has entered the command for turning over the pages of search results more than a particular number of times, the controller 180 automatically enlarges the size of the search window to increase the number of search results displayed at one time.

The controller 180 may convert the search window to the third mode for displaying the search window in full screen upon receiving a second manipulation input by the user. Here, the second manipulation corresponds to a manipulation for changing the size of the search window to more than half of the full screen size. As such, enlargement of the size of the search window to more than half of the full screen size represents the user's intention to focus on the search. Therefore, the controller 180 displays the search window in the third mode upon receiving the second manipulation input.

At this point, when the search window has been converted to the third mode, the controller 180 may control such that the image display window, which has been displaying an image, may be displayed on a partial area of the screen. This is for the user to view the TV broadcast screen even when the search window is displayed in full screen.

Additionally, the controller 180 may bookmark at least one of the entries included in the search results according to the user's selection. Further, upon receiving a third manipulation input by the user, the controller 180 may control such that as many bookmarked entries as a preset number of result displays, among the search results, on the search window, may be displayed. Here, the third manipulation is a manipulation for entering a command to display only the bookmarked search result entries.

As such, the user can check only the bookmarked entries again or check them individually because the user can bookmark desired entries among the search result entries.

As a consequence, the controller 180 can change the size of the search window variously according to a situation. Accordingly, the user can check search results more conveniently by using the search window.

Figure 2A:
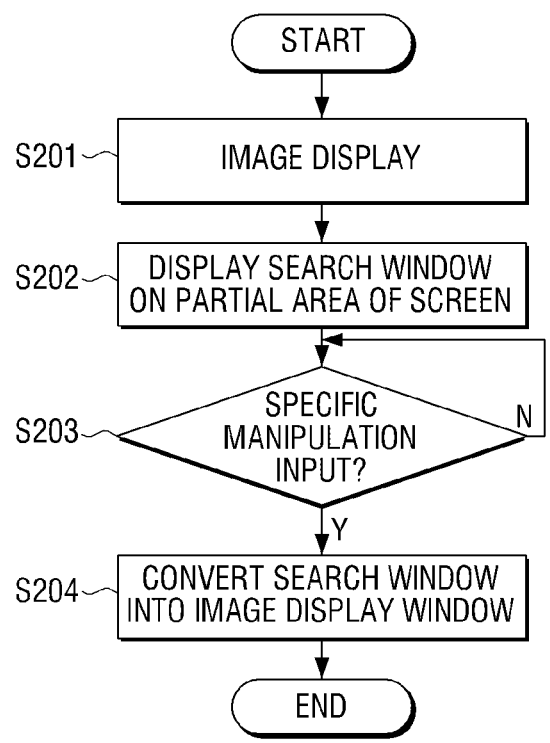
FIGS. 2A and 2B are flowcharts illustrating a method for providing a search service according to an exemplary embodiment.
Figure 2B:
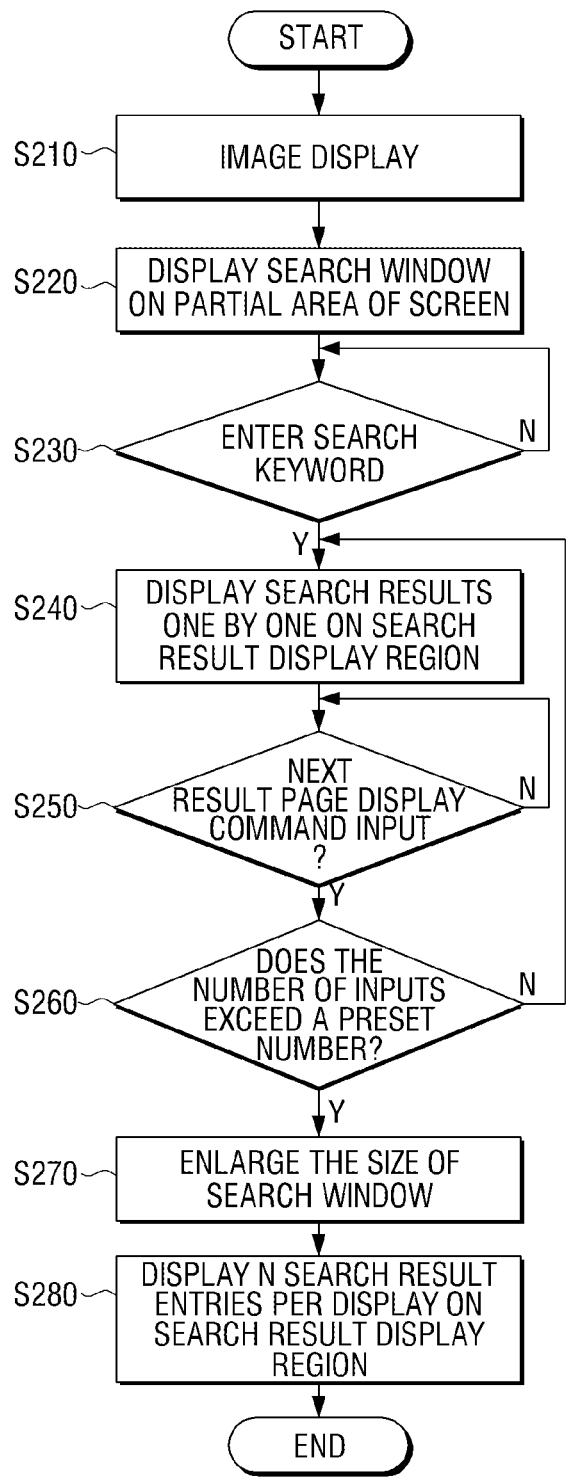

Hereinafter, a method for providing a search service will be described in detail with reference to FIGS. 2A-2B, 3 and 4. FIGS. 2A and 2B are flowcharts provided to describe a method for providing a search service according to an exemplary embodiment.

FIG. 2A is a flowchart for describing a process of converting the search window into the image display window.

The display apparatus 100 displays a broadcast image (S201). In this state, when a search window execute command is entered by a user, the display apparatus 100 displays the search window in the first mode on a partial area of the screen (S202).

In this state, the display apparatus 100 checks whether a specific manipulation is entered (S203). Here, the specific manipulation is a manipulation that generates an event for causing the display apparatus 100 to convert the search window to the image display window. If a specific manipulation is entered (S203-Y), the display apparatus 100 converts the search window into the image display window (S204). If a specific manipulation is not entered, the checking at S203 is repeated.

The specific manipulation may refer to a manipulation for displaying the search window in full screen. In this case, upon receiving the specific manipulation, the display apparatus 100 converts the search window on display into the image display window. In this case, the display apparatus 100 refreshes the full-screen display of the search window.

The specific manipulation may refer to a manipulation for changing the size of the search window to a size greater than a preset size. In this case, the display apparatus 100 displays the search window in the changed size.

The specific manipulation may refer to a manipulation for selecting an icon for converting the search window to the image display window. In this case, upon receiving an input of a selection manipulation on the icon, the display apparatus 100 converts the search window on display into the image display window.

The specific manipulation may refer to a touch and drag operation on the search window. Here, the touch and drag operation is touching the screen of the area where the search window is displayed, moving it to a particular direction, and dropping it. In this case, upon receiving an input of a touch and drag operation on the search window, the display apparatus 100 converts the search window to the image display window.

By this process, the display apparatus 100 can convert the search window into the image display window by various manipulations. Accordingly, the user can view an image as well while doing a search on the display apparatus.

Hereinafter, a process of changing the size of the search window will be described with reference to FIG. 2B. First, the display apparatus 100 displays a broadcast image (S210). In this state, when a search window execute command is entered by a user, the display apparatus 100 displays the search window in the first mode on a partial area of the screen (S220).

Specifically, the display apparatus 100 performs control such that the search window is displayed on a partial area of the screen where an image is displayed, and such that, upon receiving a search command input through the search window, search results up to a preset number of result displays are displayed on the search window. The preset number of result displays is the number of search result entries displayed at one time on the search result display region. That is, the display apparatus 100 sets the number of search result displays to 1 when displaying the search window in the first mode.

When a search keyword is entered into the search window by the user (S230-Y), the display apparatus 100 displays search results one by one on the search result display region (S240). If a search keyword is not entered, S230 is repeated. Upon the initial execution of the search window, the search results are displayed one by one on the search result display region because the search window is set to the first mode.

Afterwards, the display apparatus 100 determines whether a next page display command on the search results is entered (S250). If the next page display command is entered (S250-Y), the display apparatus 100 determines whether the number of next page display command inputs exceeds a preset number (S260). If the next page display command is not entered, S250 is repeated. If the number of next page display command inputs does not exceed the preset number (S260-N), the display apparatus 100 displays the next page of the search result entries (S240).

If the number of next page display command inputs exceeds the preset number (S260-Y), the display apparatus 100 enlarges the size of the search window (S270). Therefore, the display apparatus 100 converts the number of search displays displayed on the search window from 1 to N (where N is a natural number of 2 or more). That is, the display apparatus 100 converts the search window from the first mode to the second mode.

At this point, the display apparatus 100 determines the size of the search window, taking the entire size of the screen into consideration. For example, the display apparatus 100 may determine the size of the search window of the second mode to be ⅓ the full screen size.

As used herein, the first manipulation corresponds to a manipulation in which a command is entered more a particular number of times to turn over search results displayed in the search result display region in units of the number of search displays. That is, the first manipulation is a manipulation in which a command for turning over the pages of search results is entered more than a particular number of times. For example, when the user has entered a command for turning over the pages of search results three times, the display apparatus 100 may convert the search window from the first mode to the second mode on the point of time when the page turn command has been entered three times.

Frequent inputs of the page turn command by the user represent the user's intention to focus on finding desired search results. Therefore, when the user has entered the command for turning over the pages of search results more than a particular number of times, the controller 180 automatically enlarges the size of the search window to increase the number of search results displayed at one time.

Accordingly, the display apparatus 100 converts the search window into the second mode, and displays N search result entries per display on the search result display region (S280).

Frequent inputs of the page turn command by the user represent the user's intention to focus on finding desired search results. Therefore, through this process, when the user has entered the command for turning over the pages of search results more than a particular number of times, the display apparatus 100 automatically enlarges the size of the search window to increase the number of search results displayed at one time.

The display apparatus 100 may bookmark at least one of the entries included in the search results according to the user's selection. Further, upon receiving a third manipulation input by the user, the controller 180 may perform control such that as many bookmarked entries as a preset number of result displays, among the search results on the search window, may be displayed. Here, the third manipulation is a manipulation for entering a command to display only the bookmarked search result entries.

As such, the user can check only the bookmarked entries again, or check them individually, because the user can bookmark desired entries among the search result entries.

As a consequence, the controller 180 can change the size of the search window variously according to a situation. Accordingly, the user can check search results conveniently by using the search window.

Figure 3:
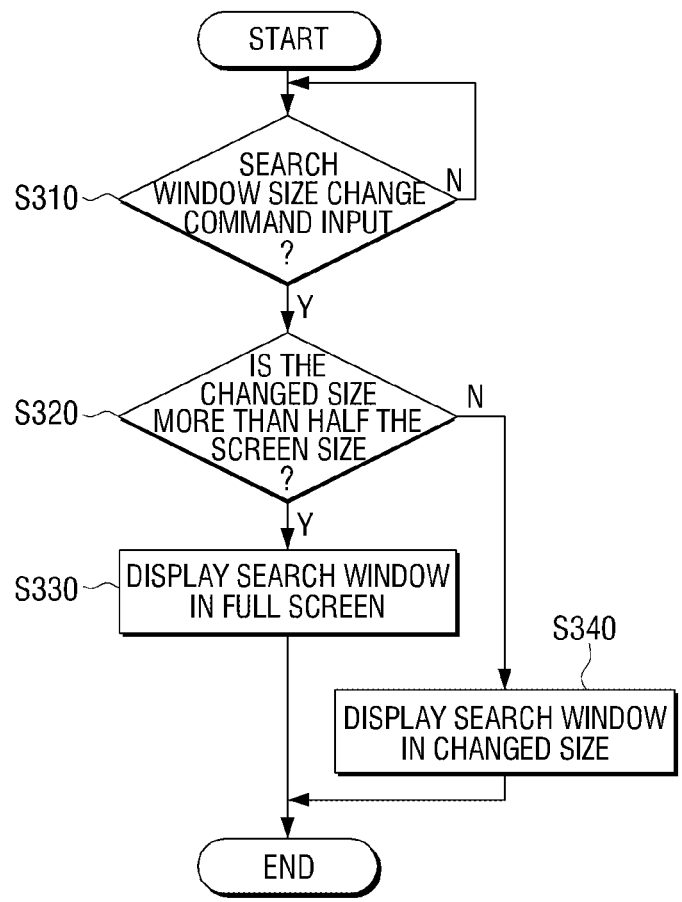
FIG. 3 is a flowchart illustrating the full-screen display of the search window according to an exemplary embodiment.

Hereinafter, a process for converting the search window into the third mode will be described with reference to FIG. 3. FIG. 3 is a flowchart provided to describe the full-screen display of the search window according to an exemplary embodiment.

With the search window being on display, the display apparatus 100 determines whether a search window size change command is entered (S310). If the search window change command is entered (S310-Y), it is determined whether the changed size of the search window is more than half the screen size (S320). If the search window change command is not entered, then S310 is repeated.

If the changed size of the search window is no more than half the screen size (S320-N), the display apparatus 100 displays the search window in the changed size (S340). If the changed size of the search window is more than half the screen size (S320-Y), the display apparatus 100 displays the search window in full screen (S330). That is, the display apparatus 100 executes the search window in the third mode.

When the search window has been converted to the third mode and displayed in full screen, the display apparatus 100 may control such that the image display window, which has been displaying an image, may be displayed on a partial area of the screen. This is for the user to view the broadcast screen even when the search window is displayed in full screen.

The display apparatus 100 may display a message asking the user whether to display the search window in full screen before displaying the search window in full screen. If the user enters a select command for displaying in full screen, the display apparatus 100 may be implemented to convert the search window into the full screen.

In this way, if the user enlarges the size of the search window, the display apparatus 100 regards this as an intention to focus on the search and displays the search window in full screen.

Figure 4:
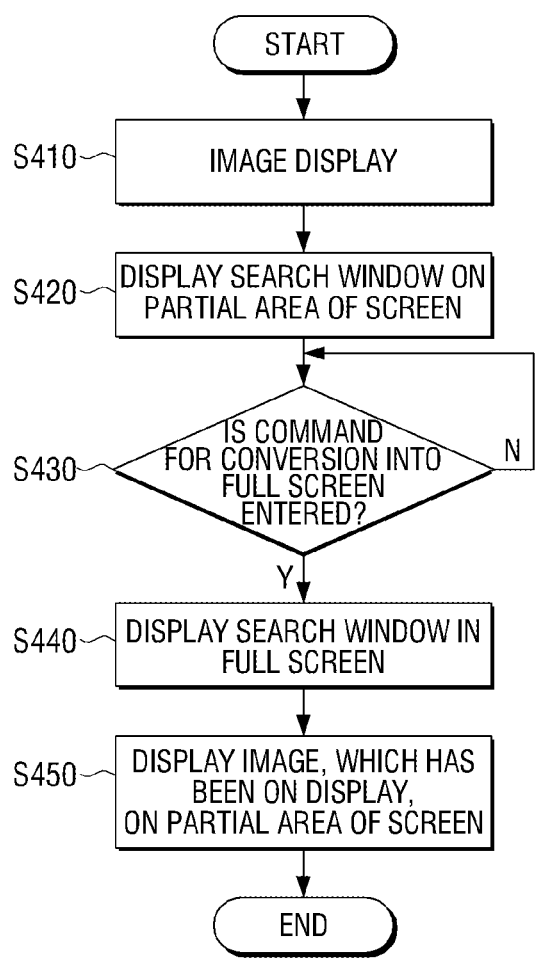
FIG. 4 is a flowchart illustrating a process of displaying an image display on a partial area of the screen when the search window is displayed on the screen according to an exemplary embodiment.

Hereinafter, a process of displaying an image on display on a partial area of the screen will be described with reference to FIG. 4. FIG. 4 is a flowchart provided to describe a process of displaying an image display on a partial area of the screen when the search window is displayed on the screen according to an exemplary embodiment.

First, the display apparatus 100 displays a broadcast image (S410). Then, when a search window display command is entered from the user, the search window is displayed on a partial area of the screen (S420).

When a command for conversion into the full screen is entered from the user (S430-Y), the display apparatus 100 displays the search window in full screen (S440). If no command for conversion is entered, S430 is repeated. In this state, the display apparatus 100 displays the image display window, which has been displaying the broadcast image, on a partial area of the screen (S450). That is, the display apparatus 100 displays the search window in full screen, and converts the existing search window on display into the image display window. Thus, the display apparatus 100 displays the broadcast image in a picture-in-picture (PIP) format on a separate image display window.

Accordingly, the display apparatus 100 can change the size of the search window variously according to a situation. Accordingly, the user can check search results conveniently by using the search window.

Figure 5:
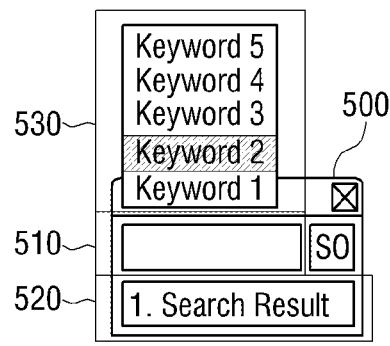
FIG. 5 is a view illustrating a structure of the search window according to an exemplary embodiment.

FIG. 5 is a view illustrating a structure of a search window according to an exemplary embodiment.

The search window 500 comprises a search keyword input region 510 and a search result display region 520.

The search keyword input region 510 is a region into which a search keyword is entered by the user. The search result display region 520 is a region in which information searched by the search keyword is displayed.

The search window 500 shown in FIG. 5 is a search window corresponding to the first mode. Accordingly, it can be observed that only one search result is displayed in the search result display region 520 of the search window 500.

The search window 500 may display a keyword recommendation list 530. The keyword recommendation list 530 is a list of keywords which are extracted by taking into account the search history of the user and displayed y the display apparatus 100.

Figure 6A:
FIGS. 6A to 6D are views illustrating the process of changes of the search window for each mode according to an exemplary embodiment.

FIGS. 6A to 6D are views illustrating the process of changes of the search window for each mode according to an exemplary embodiment. FIG. 6A depicts the search window 610 being displayed in the first mode when a broadcast image is displayed on the screen of the display apparatus 100.

As illustrated in FIG. 6A, the display apparatus 100 displays the search window 610 of the first mode on a partial area of the right lower part of the screen. Only one search result is displayed on the search window 610.

In this state, when the user enters the left button or right button of the remote control, the display apparatus 100 changes the search result displayed on the search window to the previous result entry or the next result entry.

Figure 6B:
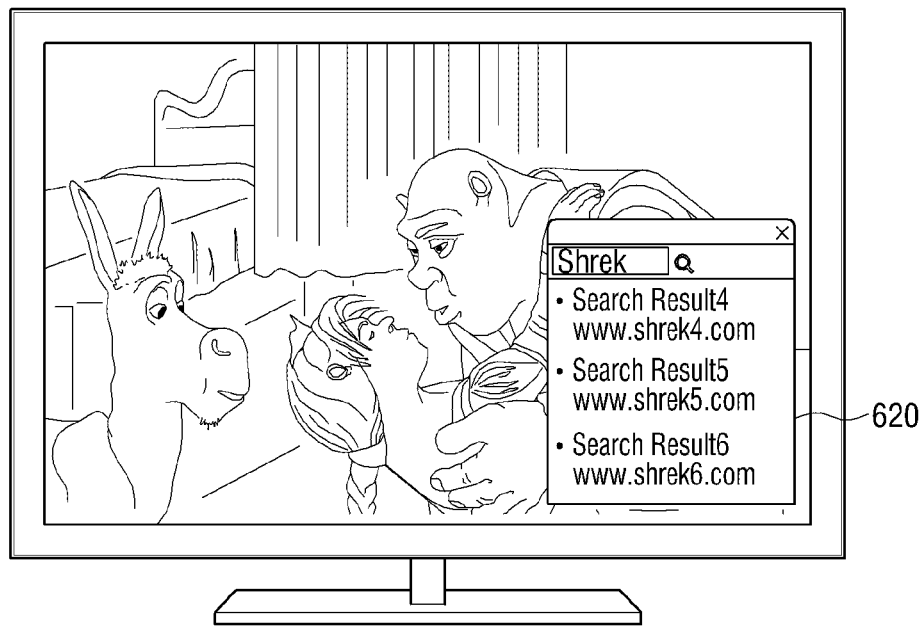

If a manipulation for turning to the next result entry is entered more than a particular number of times, the display apparatus 100 converts the search window into the search window 620 of the second mode as shown in FIG. 6B.

As shown in FIG. 6B, three search result entries are displayed on the search window 620 of the second mode. In this case, the number of search result displays is set to a3.

Figure 6C:
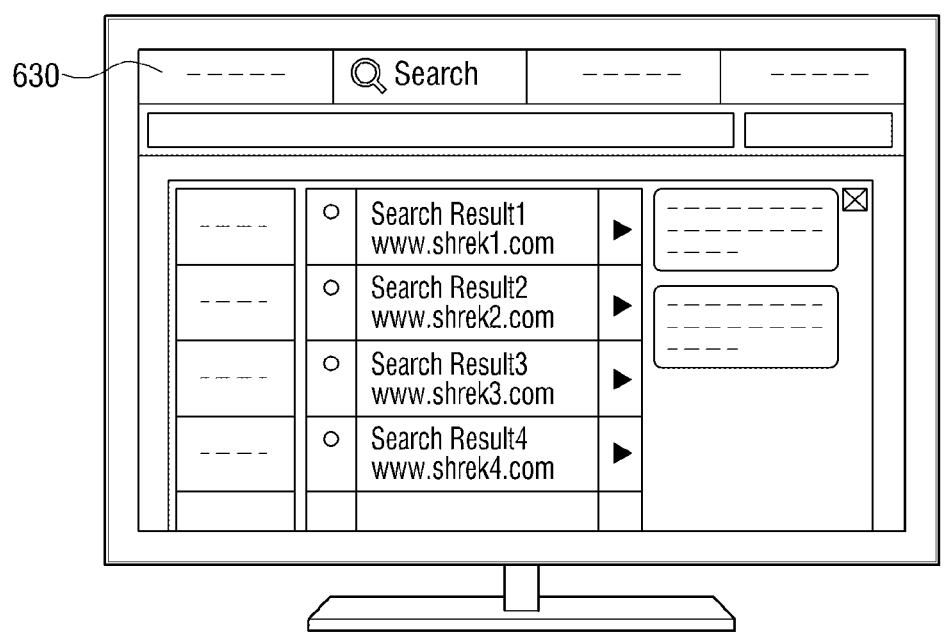

When a full screen display command is entered by the user, the display apparatus 100 displays the search window 630 of the third mode as shown in FIG. 6C. The search window 630 of the third mode is a search window displayed on the full screen.

Figure 6D:
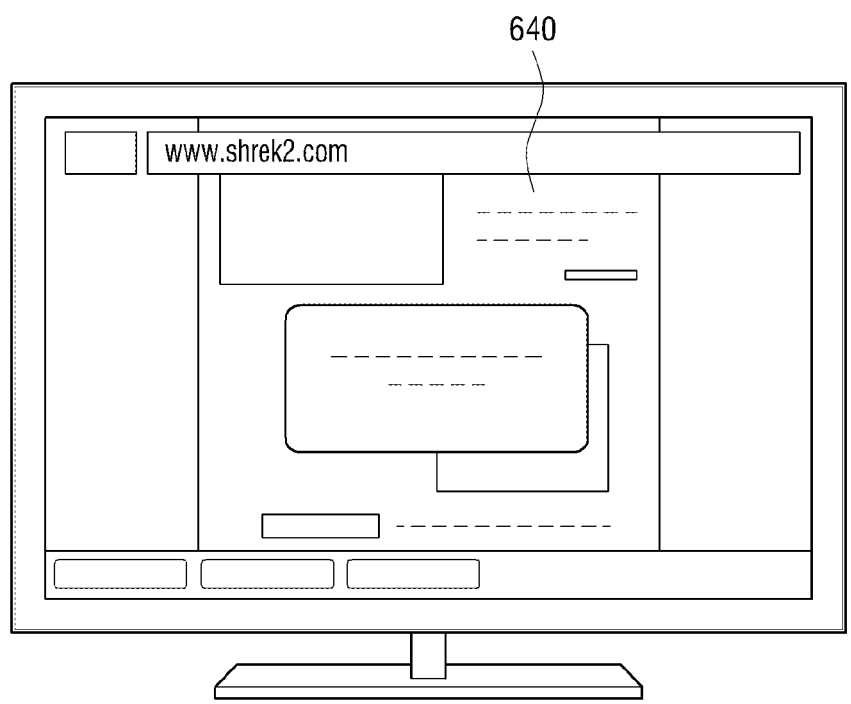

In this state, if the user selects "Search Result 2" from among the search results, the display apparatus 100 displays a web browser screen 640 connected to the site corresponding to "Search Result 2" as shown in FIG. 6D.

The display apparatus 100 can thus adjust the size of the search window to various sizes according to a situation.

Figure 7A:
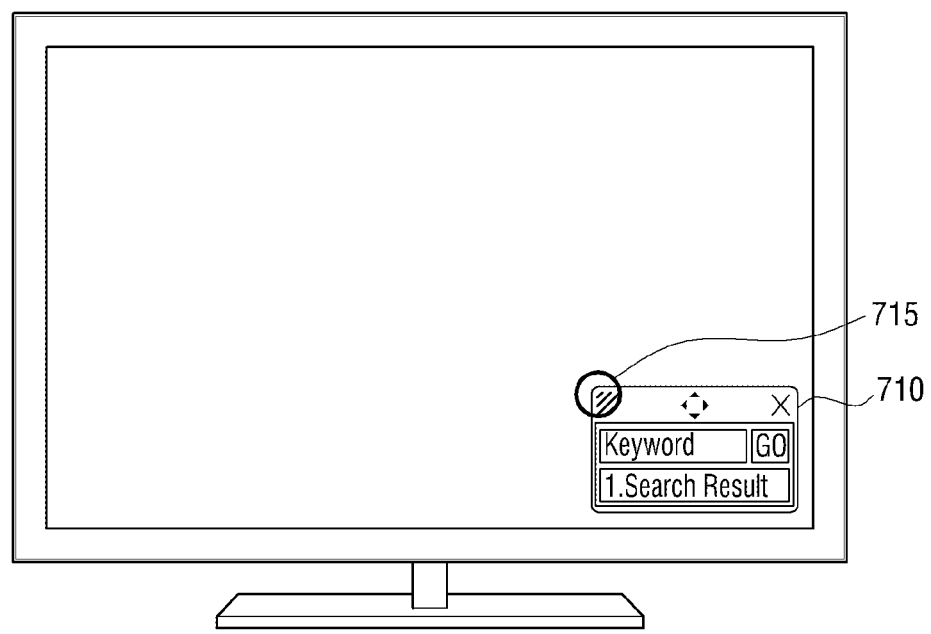
FIGS. 7A to 7D are views illustrating a process of changing the size of the search window according to an exemplary embodiment.

FIGS. 7A to 7D are views illustrating a process of changing the size of the search window according to an exemplary embodiment. As illustrated in FIG. 7A, a Change Size icon 715 is included in the search window 710.

The Change Size icon 715 is an icon for changing the size of the search window 710 when the user touches the icon or clicks and drags the icon. That is, if the user drags the Change Size icon 715, the display apparatus 100 accepts this as a Change Size command, and changes the size of the search window 710.

Figure 7B:
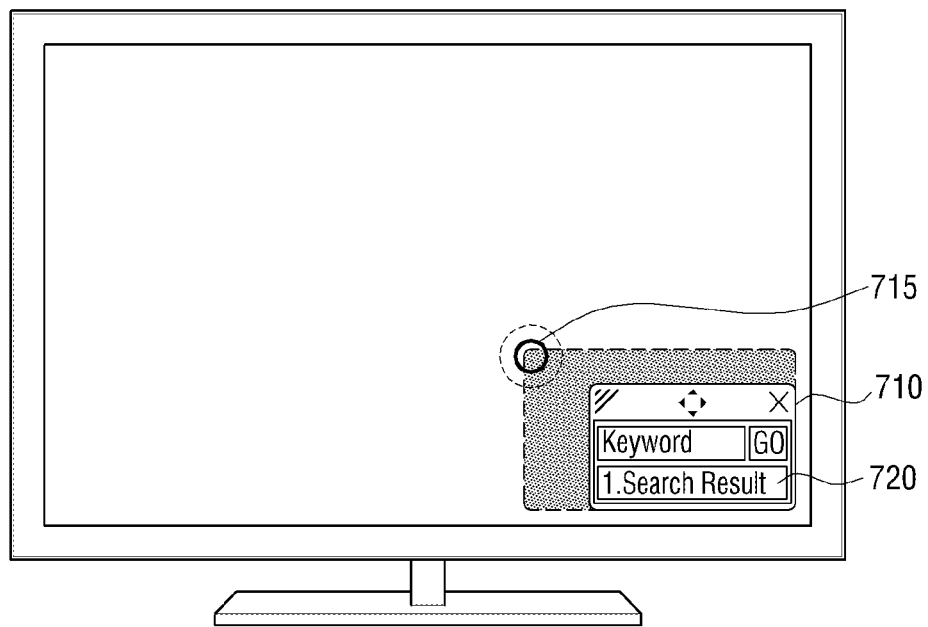
Figure 7C:
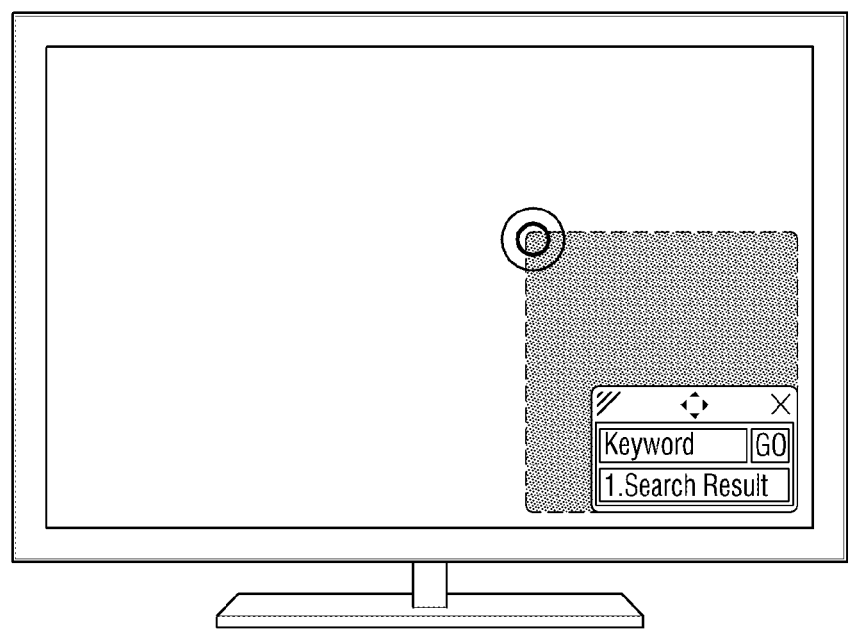

FIGS. 7B and 7C illustrate that the size of the search window 710 is changed by dragging the Change Size icon 715 when only one search result is displayed in the search result display region of the search window 710.

Figure 7D:
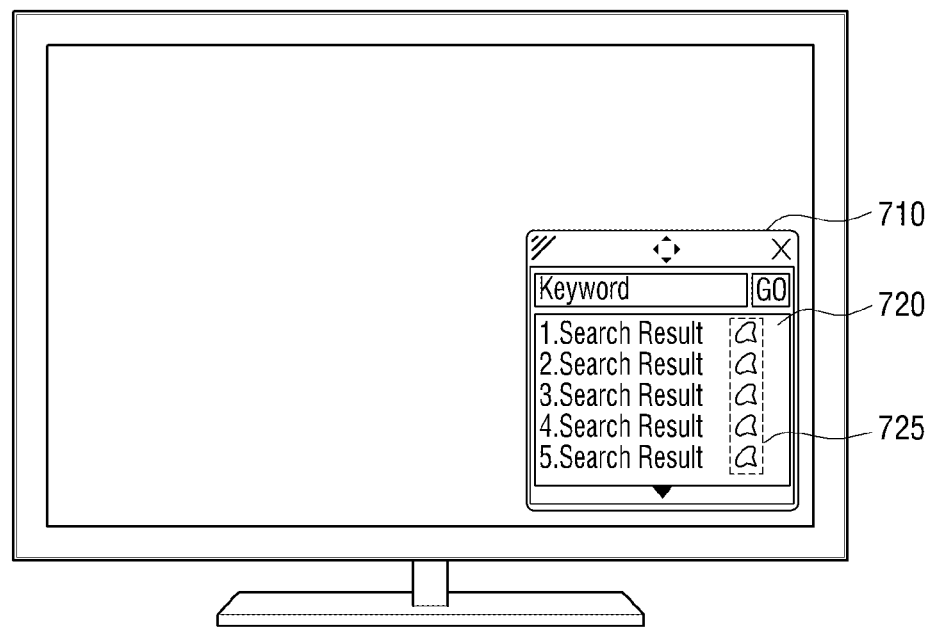

When the Change Size command is entered by dragging the Change Size icon 715, it can be observed that, as shown in FIG. 7D, the size of the search window 710 is enlarged and the number of search results displayed at a time on the search result display region 720 is increased from 1 to 5.

Moreover, it can be observed that Bookmark icons 725 for bookmarking a search result entry are displayed in the respective search result entries of the search result display region 720 of FIG. 7D. When the user selects a Bookmark icon 725 for an entry, the display apparatus 100 bookmarks the result entry whose Bookmark icon 725 has been selected. Then, the display apparatus 100 displays the Bookmark icon 725 of the bookmarked result entry differently from the other Bookmark icons. For example but not by way of limitation, the display apparatus 100 may display the Bookmark icon 725 of the bookmarked result entry to be varied in color.

The display apparatus 100 may thus adjust the size of the search window using the Change Size icon 715.

Figure 8A:
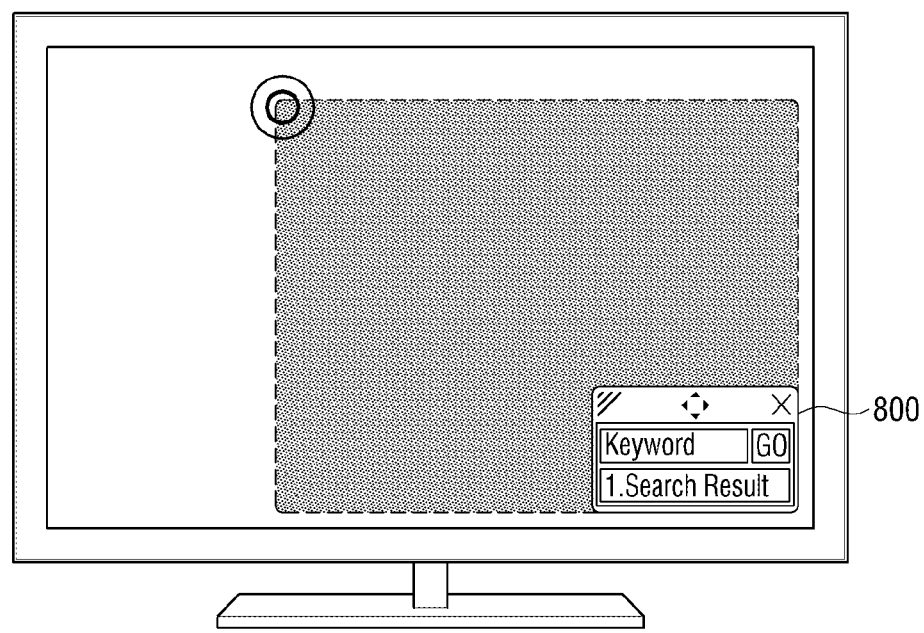
FIGS. 8A to 8D are views illustrating a case where the size of the search window is enlarged to a size greater than half of the screen size according to an exemplary embodiment.

FIGS. 8A to 8D are views illustrating a case where the size of the search window is enlarged to a size greater than half the screen size according to an exemplary embodiment. FIG. 8A illustrates a case where the size of the search window 800 is enlarged to a size greater than half the screen size by the user's dragging the Change Size icon.

Figure 8B:
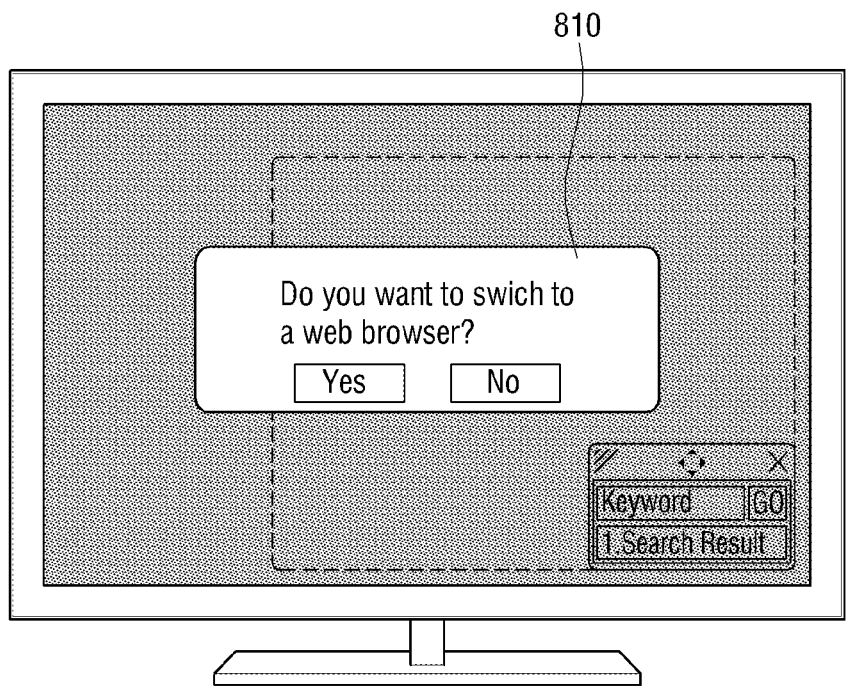

If the size of the search window is enlarged to a size greater than half the screen as show in FIG. 8A, the display apparatus 100 displays a confirm message 810 on the screen to confirm whether to convert the search window into a web browser (i.e., the search window of the third mode) as shown in FIG. 8B.

Figure 8C:
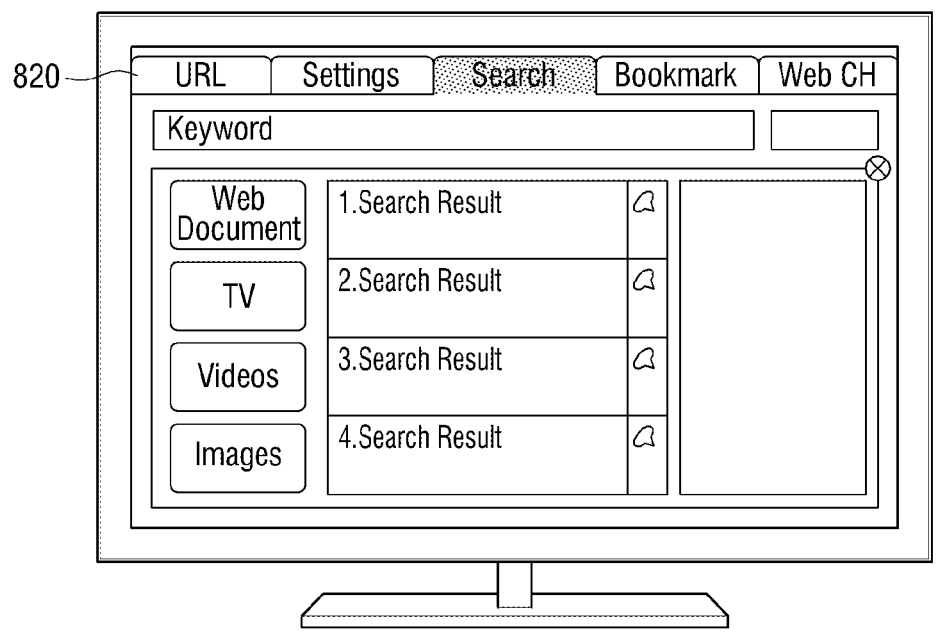
Figure 8D:
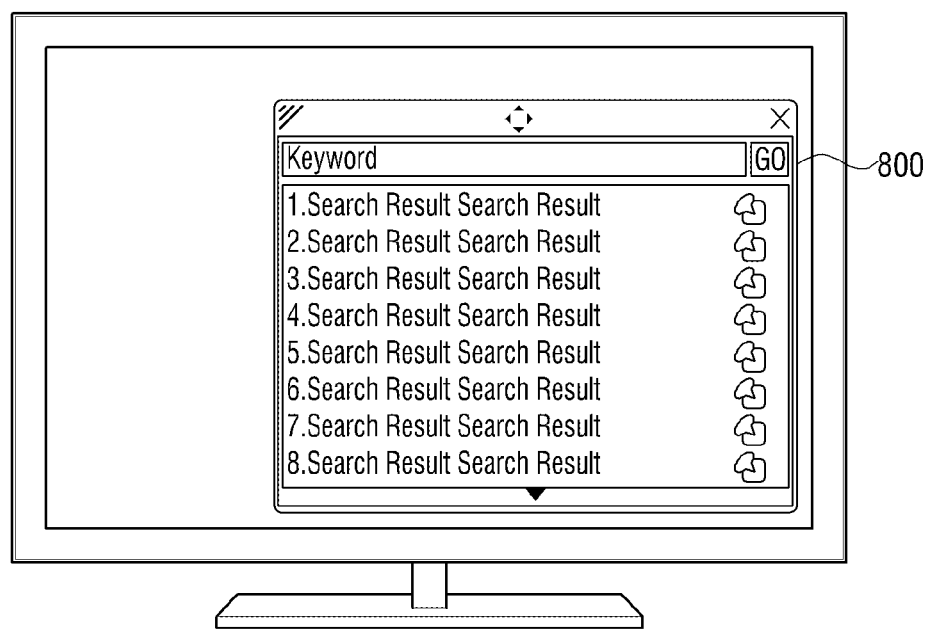

If the user selects Yes, the display apparatus 100 displays the search window 820 of the third mode in the form of the web browser as shown in FIG. 8C. If the user selects No, the display apparatus 100 changes the size of the search window 800 as shown in FIG. 8D.

FIGS. 9A to 9D are views illustrating a process of bookmarking search results when the search window is displayed in the first mode and a process of displaying the bookmarked search results according to an exemplary embodiment.

Figure 9A:
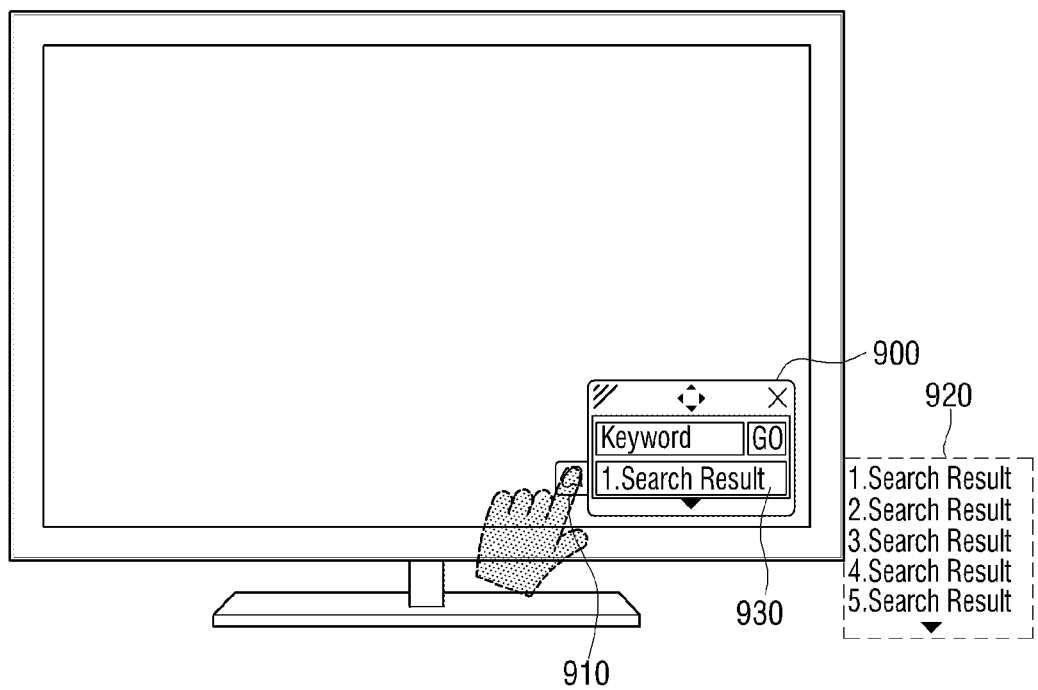
FIGS. 9A to 9D are views illustrating a process of bookmarking search results when the search window is displayed in the first mode and a process of displaying the bookmarked search results according to an exemplary embodiment.

FIG. 9A illustrates the search window 900 of the first mode which displays the search results one by one on the search result display region 930. In FIG. 9A, a search result list 920 shows the search result entries to be displayed on the search result display region 930.

In FIG. 9A, a Display Bookmark icon 910 is displayed. The Display Bookmark icon 910 executes the function of displaying only the bookmarked result entries on the search result display region. FIG. 9A illustrates a deactivated state of the Display Bookmark icon 910.

Figure 9B:
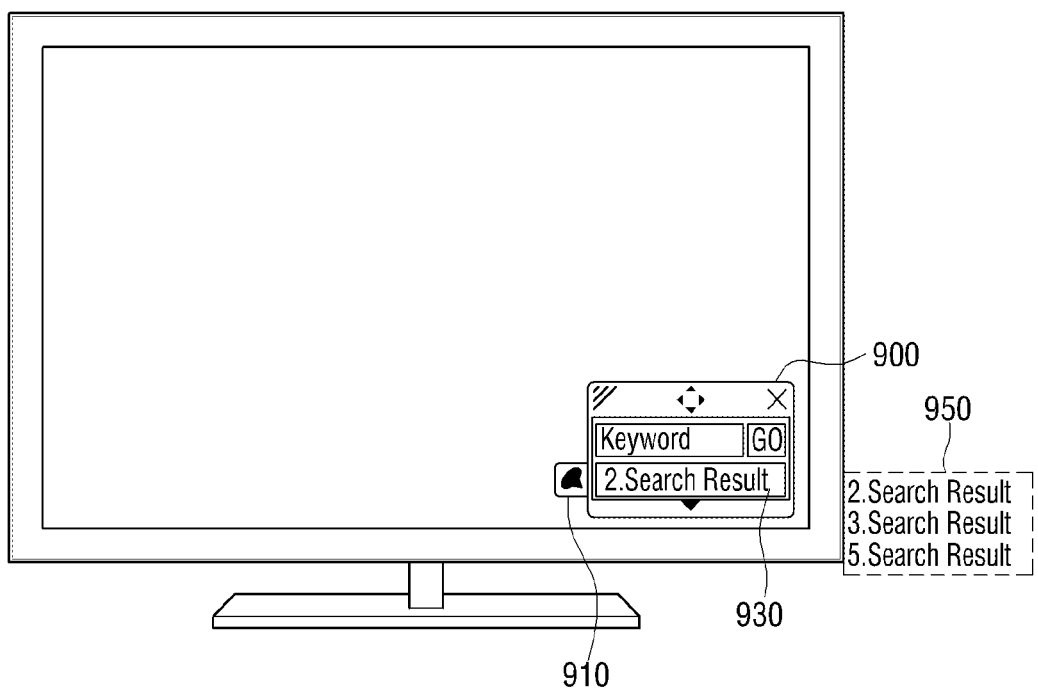

When the Display Bookmark icon 910 is selected by the user, only the bookmarked result entries are included in the search result list 950 as shown in FIG. 9B. For example, the bookmarked search result entries include '2. Search Result', '3. Search Result', and '5. Search Result'. Also, it can be found that '2. Search Result' is displayed on the search result display region 930.

Figure 9C:
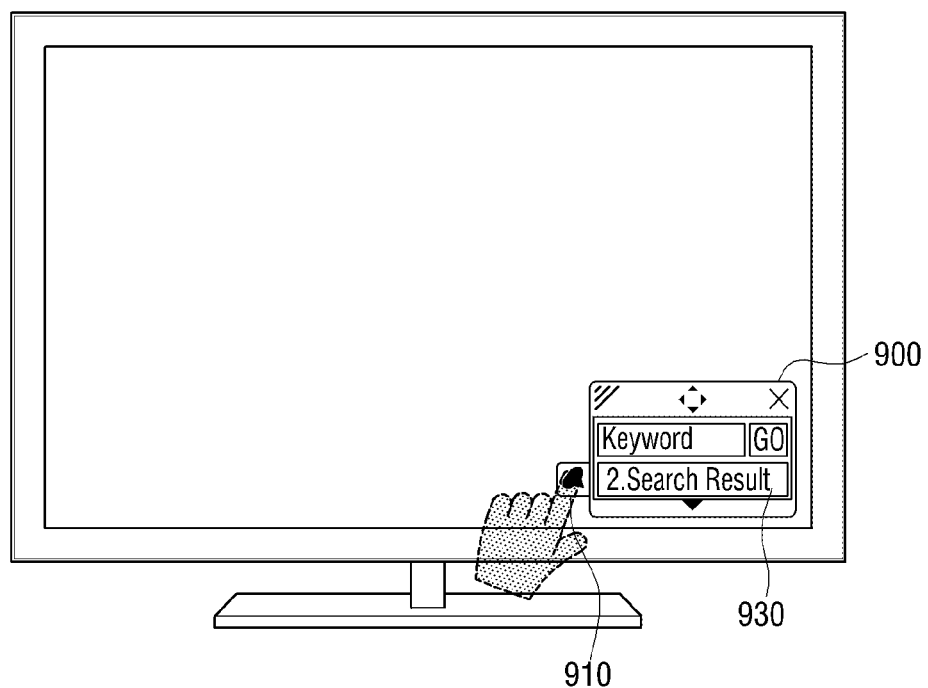
Figure 9D:
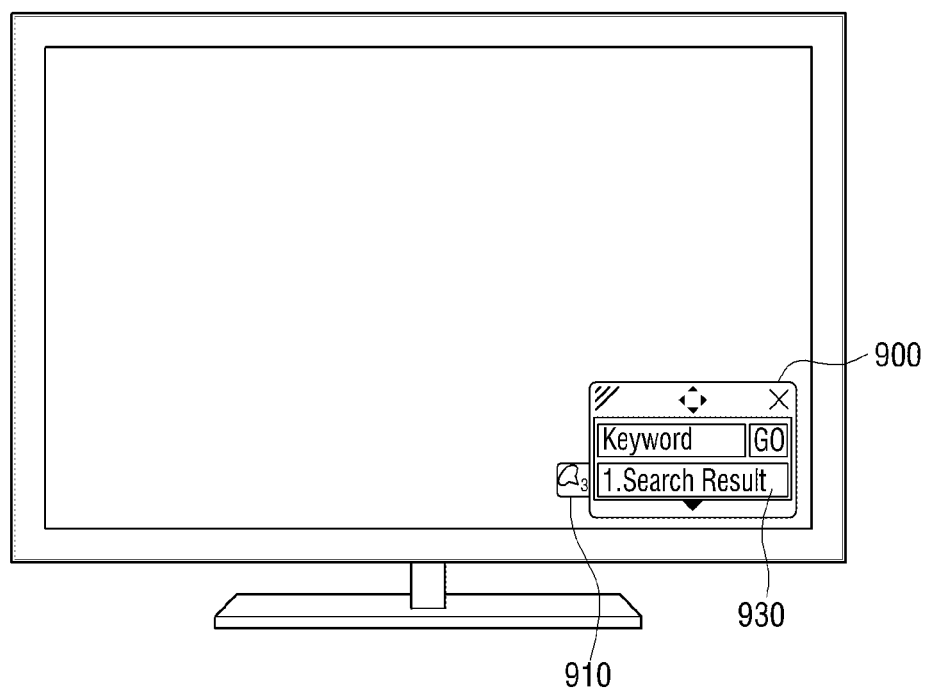

When the Display Bookmark icon 910 is selected again by the user as shown in FIG. 9C, the search window 900 returns to the state of displaying the current search results, as shown in FIG. 9D.

As such, the display apparatus 100 may display only the bookmarked search entries by using the Display Bookmark icon 910.

Figure 10A:
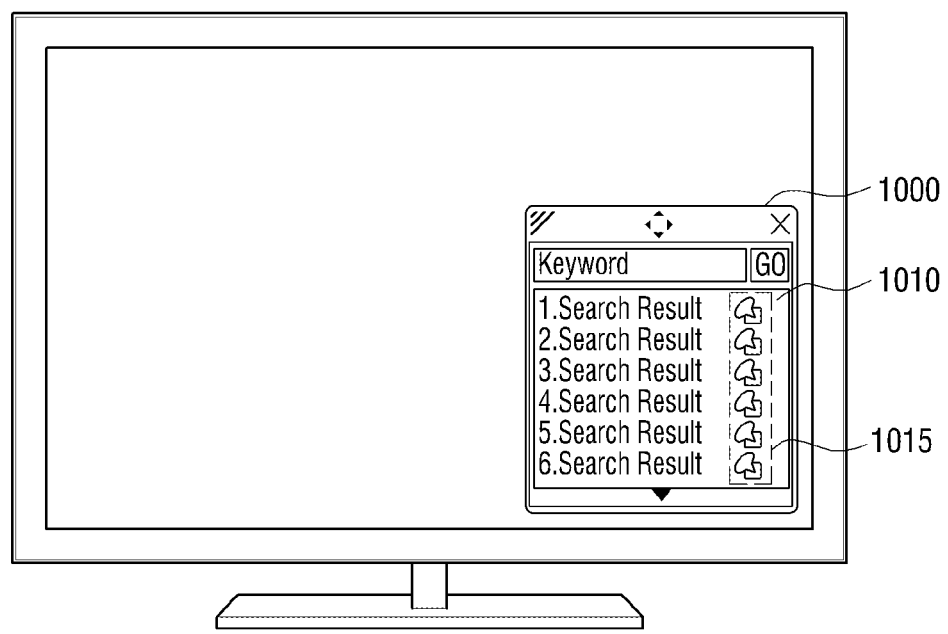
FIGS. 10A to 10C are views illustrating a process of bookmarking search results when the search window is displayed in the second mode and a process of displaying the bookmarked search results according to an exemplary embodiment.
Figure 10B:
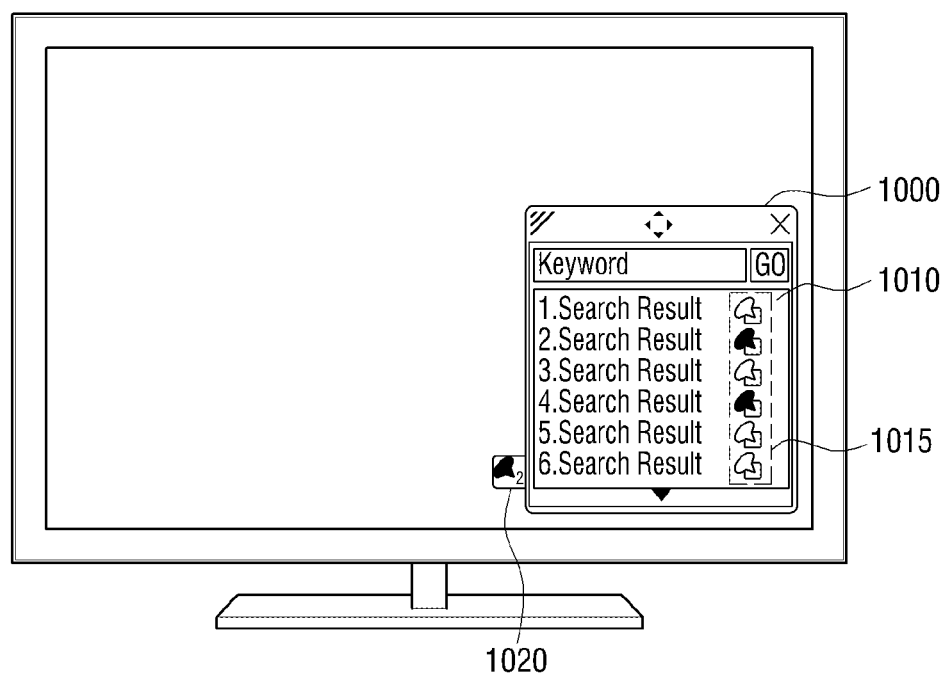
Figure 10C:
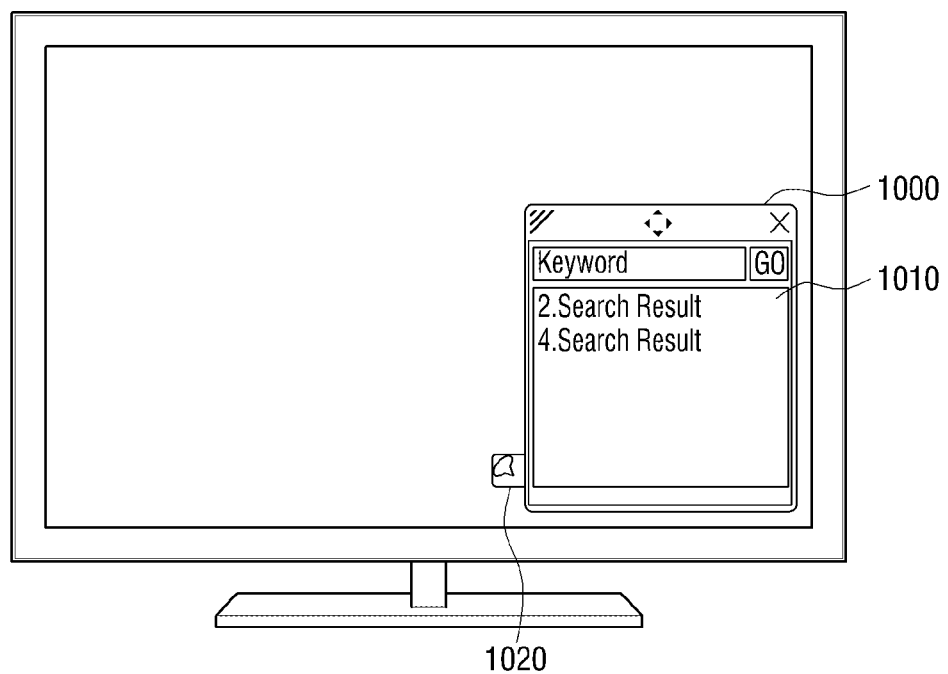

FIGS. 10A to 10C are views illustrating a process of bookmarking search results when the search window is displayed in the second mode and a process of displaying the bookmarked search results according to an exemplary embodiment.

As shown in FIG. 10A, the search window 1000 is in the second mode in which a plurality of search results are displayed. Also, Bookmark icons 1015 are displayed for the respective entries on the search result display region 1010. Using these icons, the user is able to bookmark desired result entries.

FIG. 10B illustrates a state where '2. Search Result' and '4. Search Result' are bookmarked. As shown in FIG. 10B, the Bookmark icons of '2. Search Result' and '4. Search Result' are displayed differently from that of the other Bookmark icons.

Moreover, it can be observed that the display apparatus 100 displays the Display Bookmark icon 1020 as well. In this state, when the Display Bookmark icon 1020 is selected by the user, the display apparatus 100 displays only the bookmarked result entries on the search result display region 1010. Accordingly, as shown in FIG. 10C, it can be found that the display apparatus 100 displays only the bookmarked result entries '2. Search Result' and '4. Search Result' on the search result display region 1010.

As such, the display apparatus 100 can display only the bookmarked search result entries on the search result display region.

Figure 11:
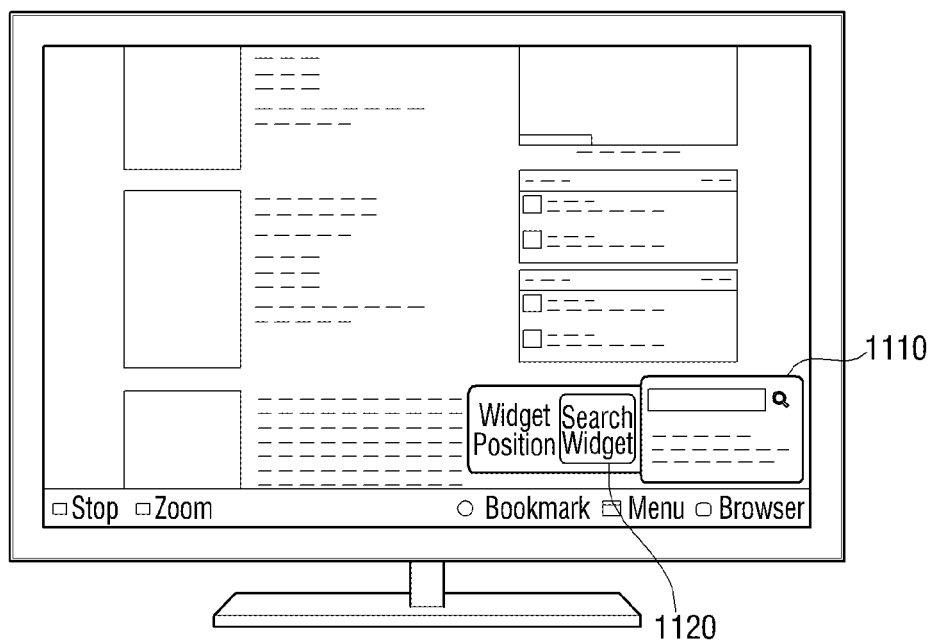
FIG. 11 is a view illustrating that the search window is displayed in a partial area of the screen according to an exemplary embodiment.

FIG. 11 is a view illustrating that the search window 1110 is displayed in a partial area of the screen according to an exemplary embodiment. The display apparatus 100 may display the search window 1110 on a part of the screen. Also, the display apparatus 100 may display "Search Widget", on an information display region 1120, indicating that the current window is a search window.

Figure 12:
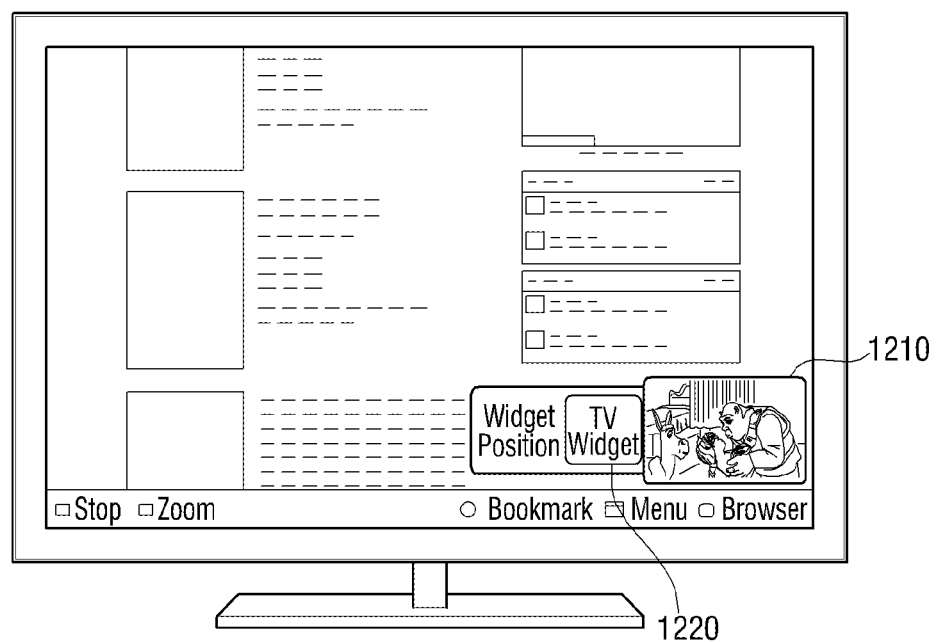
FIG. 12 is a view illustrating that a display apparatus image is displayed in a partial area of the screen according to an exemplary embodiment.

FIG. 12 is a view illustrating that a broadcast image is displayed in a partial area of the screen according to an exemplary embodiment. The TV 100 may display an image display window 1210 as well that displays a broadcast image in a PIP format while displaying an Internet browser or displaying the search window in full screen. Also, the display apparatus 100 may display "TV Widget", on the information display region 1220, indicating that the current window is a TV image display window.

FIGS. 13A to 13D are views illustrating a process of displaying a TV image along with a selected website when a search result is selected according to an exemplary embodiment.

Figure 13A:
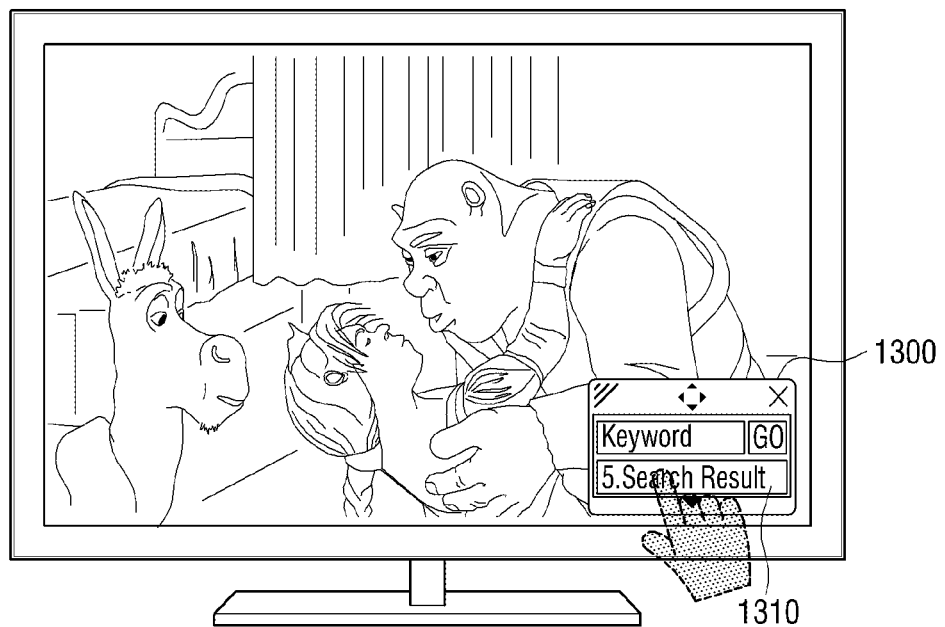
FIGS. 13A to 13D are views illustrating a process of displaying a display apparatus image along with a selected website when a search result is selected according to an exemplary embodiment.

FIG. 13A illustrates that the search window 1300 of the first mode is displayed on a partial area of the screen. Also, it can be observed that '5. Search Result' is displayed on the result display region 1310 of the search window 1300.

Figure 13B:
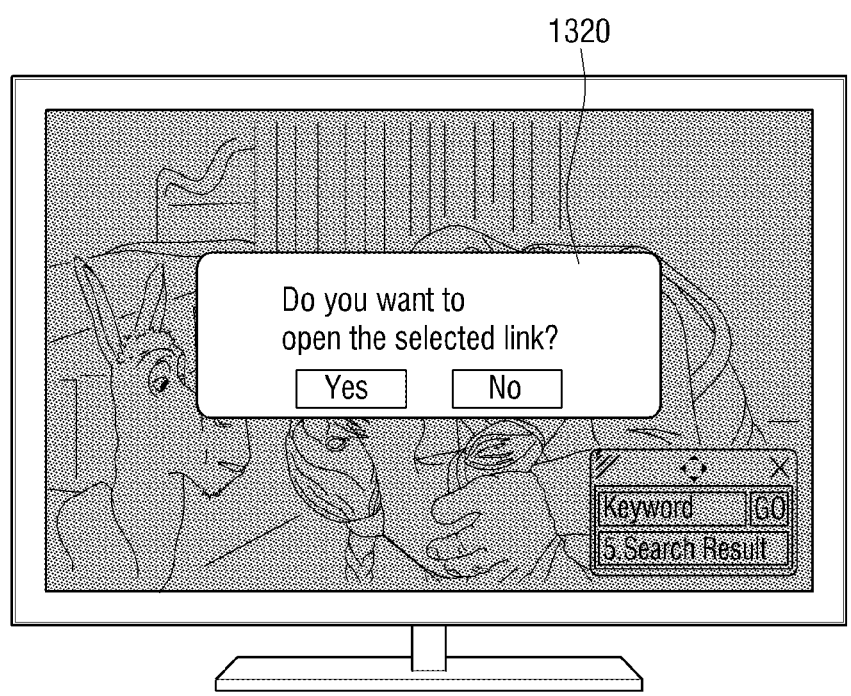

When '5. Search Result' is selected as shown in FIG. 13A, the display apparatus 100 displays a message 1320 asking whether to connect to the link of the selected result entry as shown in FIG. 13B.

Figure 13C:
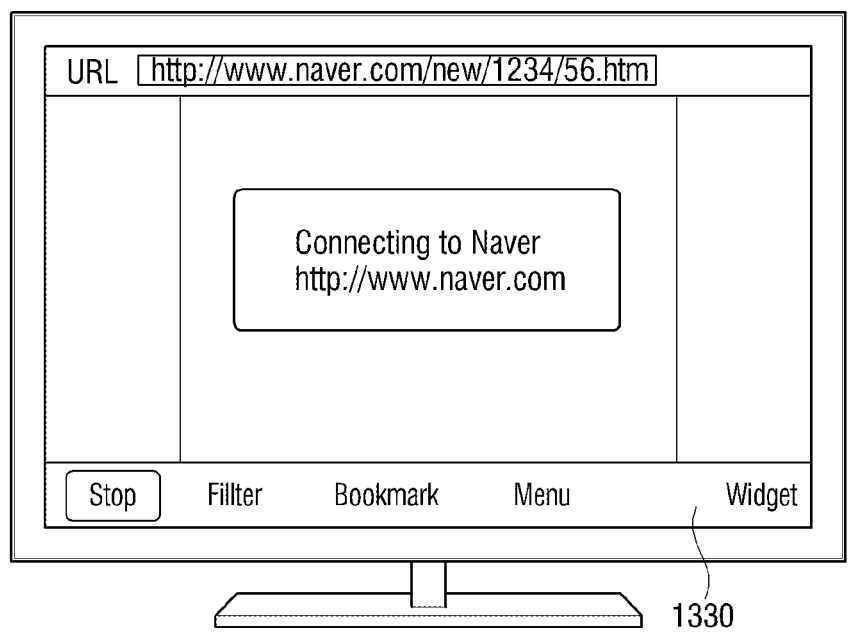

If the user selects Yes, the display apparatus 100 displays a web browser screen 1330 connected to the site corresponding to '5. Search Result' as shown in FIG. 13C.

Figure 13D:
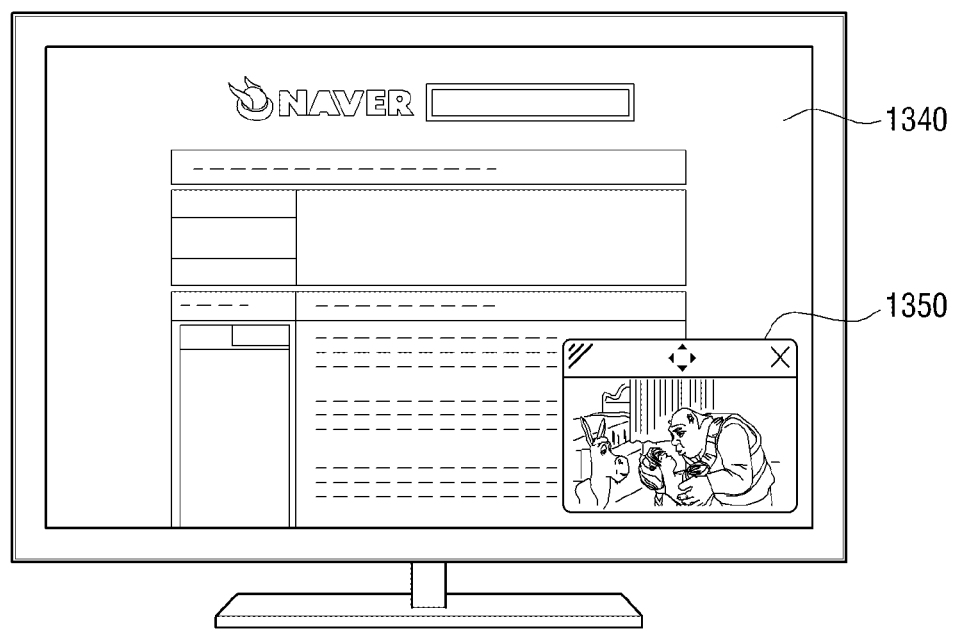

FIG. 13D illustrates a web browser screen 1340 when a connection is completed. Also, as shown in FIG. 13D, it can be observed that the display apparatus 100 displays an image display window 1350 as well that displays a broadcast screen in a partial area.

When the user selects a search result on the search window and establishes a connection, the display apparatus 100 displays a TV image on the image display window 1350 while connecting to a site corresponding to the selected search result entry.

FIGS. 14A to 14D are views illustrating a process of displaying the search window along with a selected website when a search result is selected according to an exemplary embodiment.

Figure 14A:
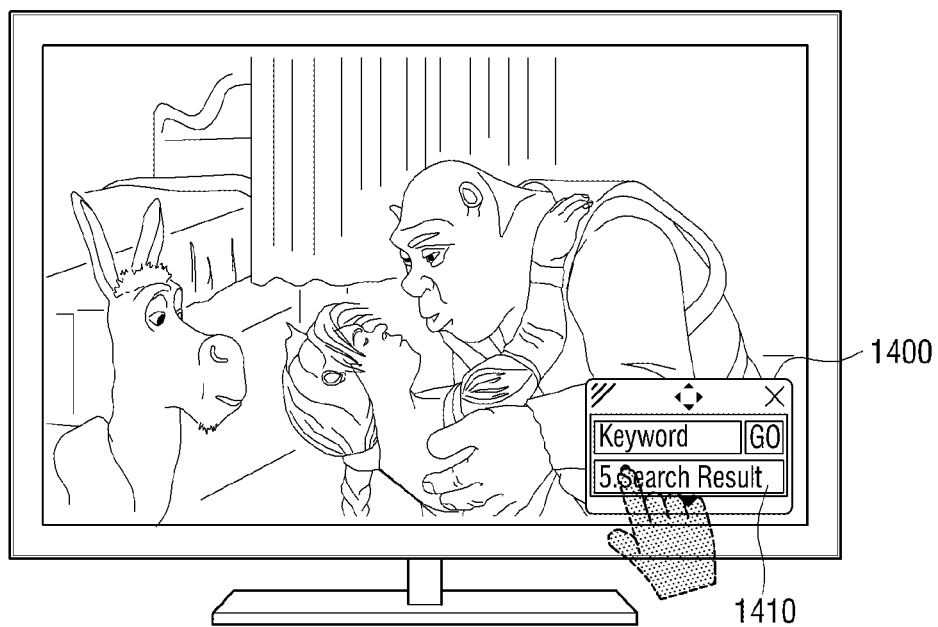
FIGS. 14A to 14D are views illustrating a process of displaying the search window along with a selected website when a search result is selected according to an exemplary embodiment.

FIG. 14A illustrates that the search window 1400 of the first mode is displayed on a partial area of the screen. Also, it can be observed that '5. Search Result' is displayed on the result display region 1410 of the search window 1400.

Figure 14B:
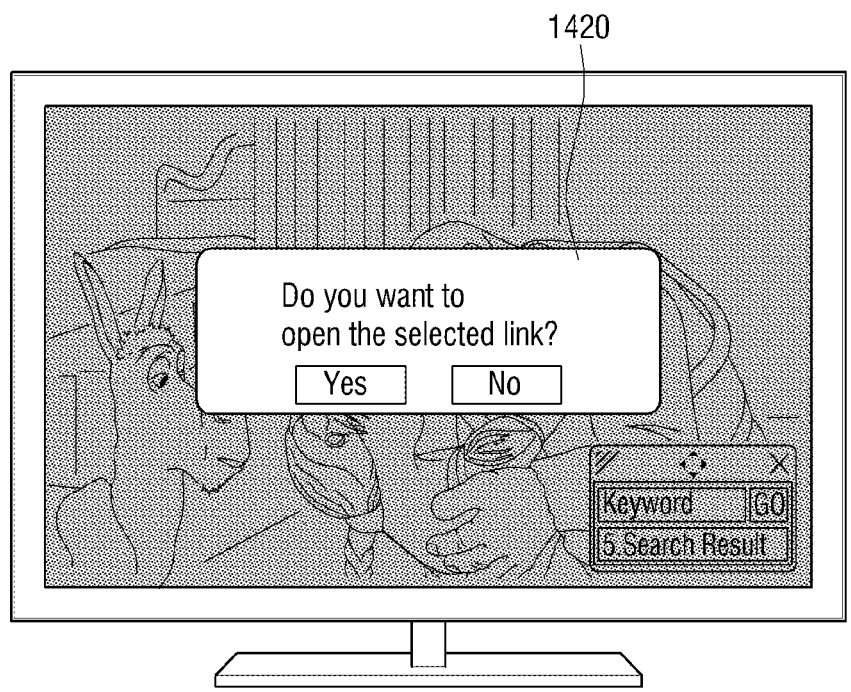

When '5. Search Result' is selected by the user as shown in FIG. 14A, the display apparatus 100 displays a message 1420 asking whether to connect to the link of the selected result entry as shown in FIG. 14B.

Figure 14C:
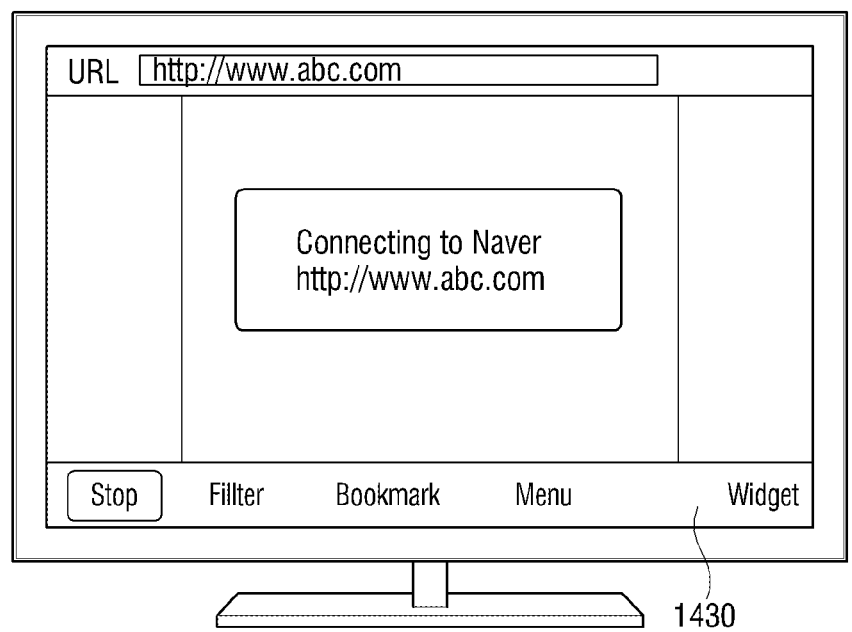

If the user selects Yes, the display apparatus 100 displays a web browser screen 1430 connected to the site corresponding to '5. Search Result' as shown in FIG. 14C.

Figure 14D:
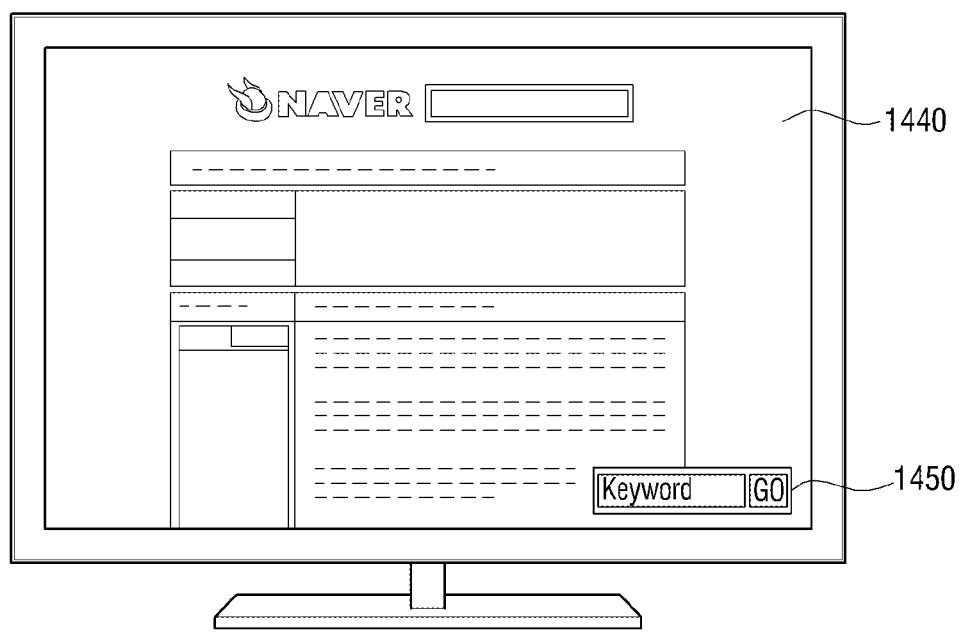

FIG. 14D illustrates a web browser screen 1440 when a connection is completed. The display apparatus 100 displays the search window 1450 of the first mode as well.

When the user selects a search result on the search window and establishes a connection, the display apparatus 100 displays the search window 1450 while connecting to a site corresponding to the selected search result entry.

Figure 15A:
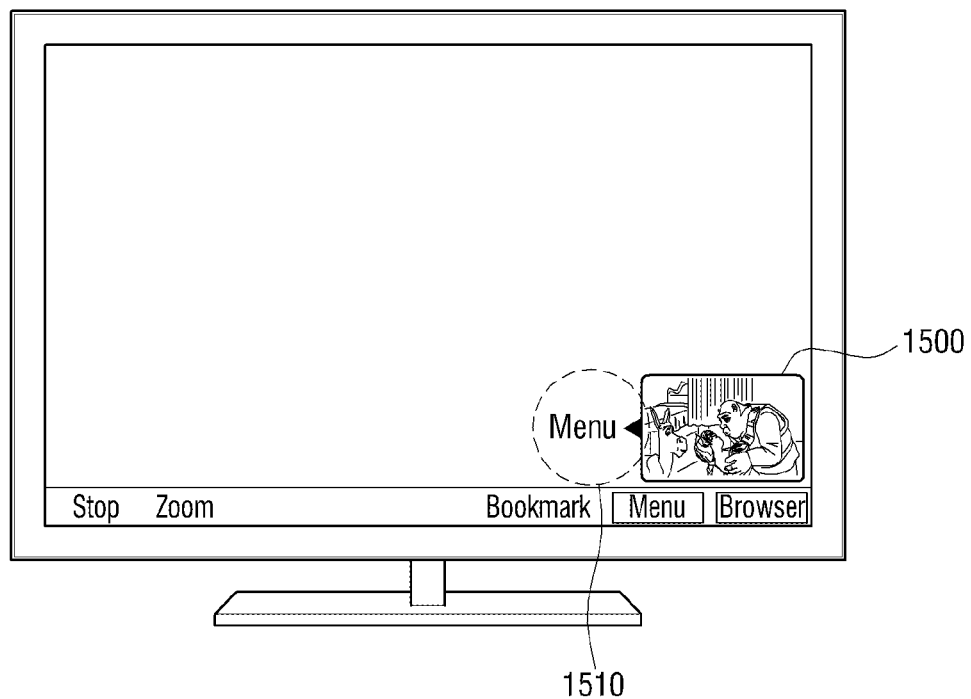
FIGS. 15A and 15B are views illustrating a menu for converting between the search window and the display apparatus image display window according to an exemplary embodiment.
Figure 15B:
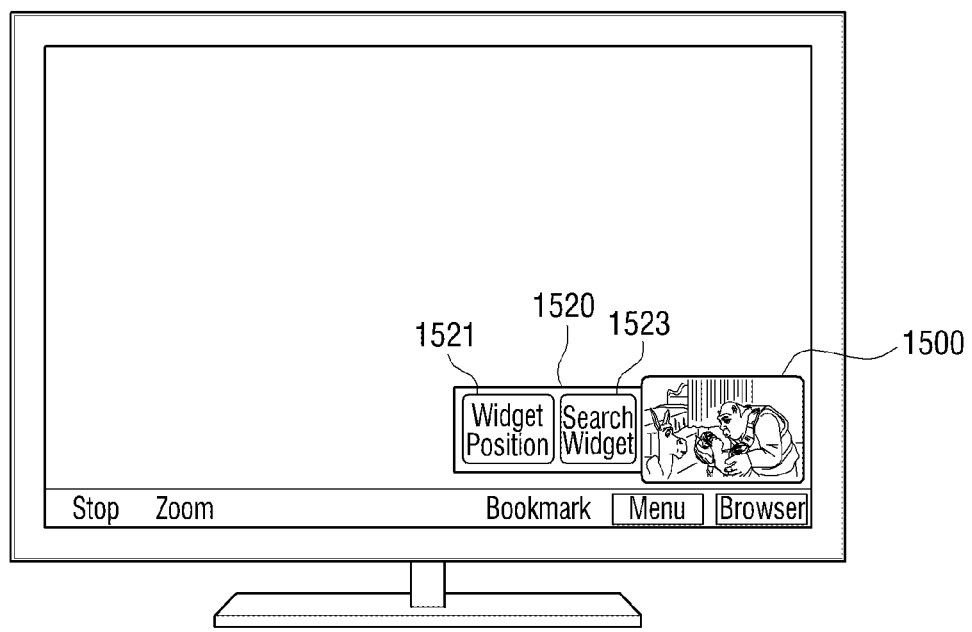

FIGS. 15A and 15B are views illustrating a menu for converting between the search window and the image display window according to an exemplary embodiment.

FIG. 15A illustrates that the image display window 1500 is displayed on a partial area of the screen. Also, a Menu icon 1510 is displayed on the image display window 1500.

When the Menu icon 1510 is selected, the display apparatus 100 displays the menu 1520 for the image display window 1500 as shown in FIG. 15B. A Widget Position icon 1521 is a menu that functions to adjust the position of the image display window 1500.

A 'Search Widget' icon 1523 corresponds to an icon functioning to convert the image display window 1500 into the search window. Accordingly, when the Search Widget' icon 1523 is selected by the user, the display apparatus 100 converts the image display window 1500 into the search window.

Similarly, the menu for the search window includes an icon for conversion into the image display window. Therefore, when the icon for conversion into the image display window is selected, with the search window being on display, the display apparatus 100 converts the search window into the image display window.

Figure 16A:
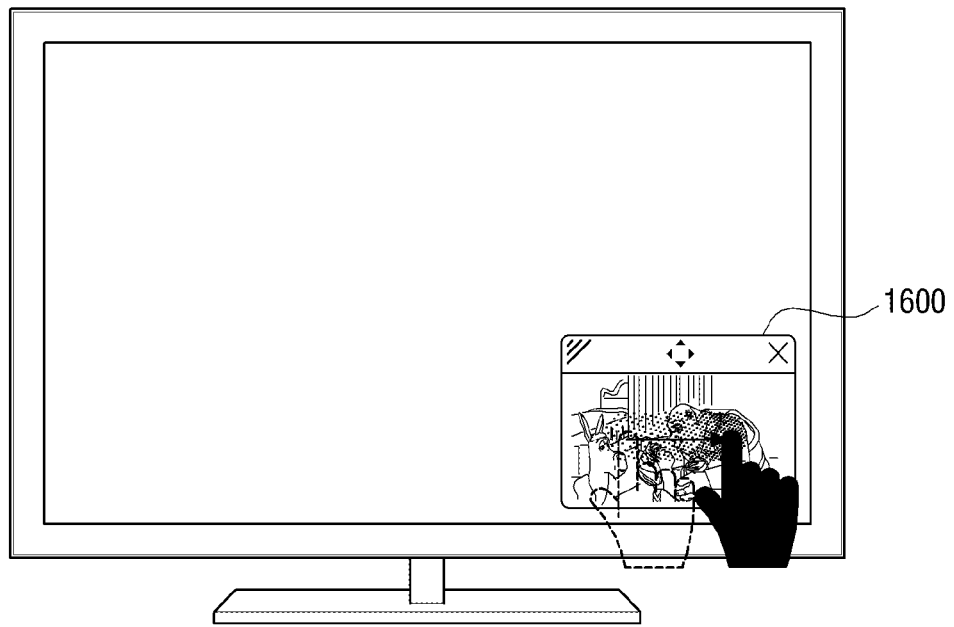
FIGS. 16A to 16C are views illustrating an animation effect of a process of converting between the search window and the display apparatus image display window according to an exemplary embodiment.
Figure 16B:
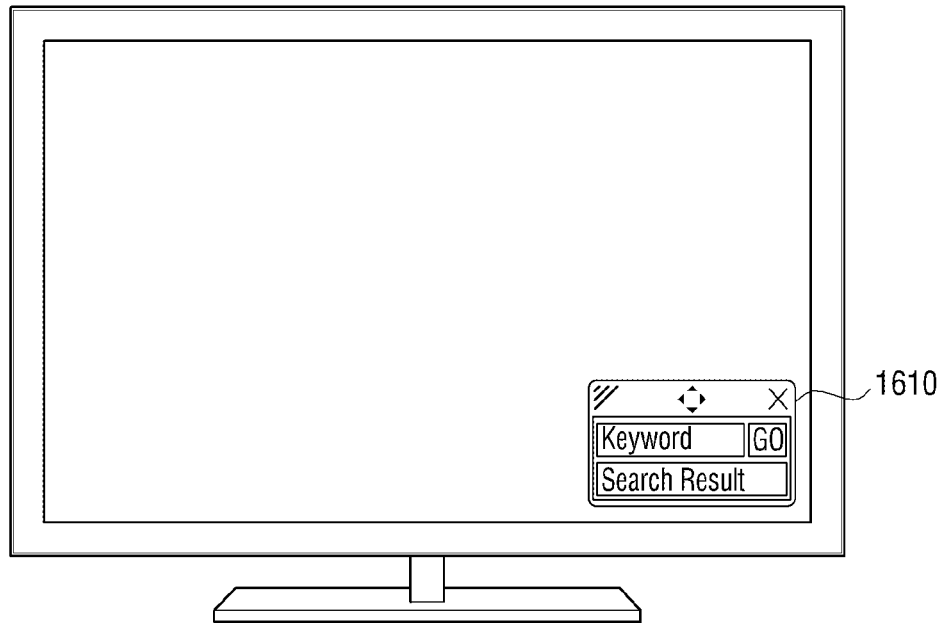
Figure 16C:
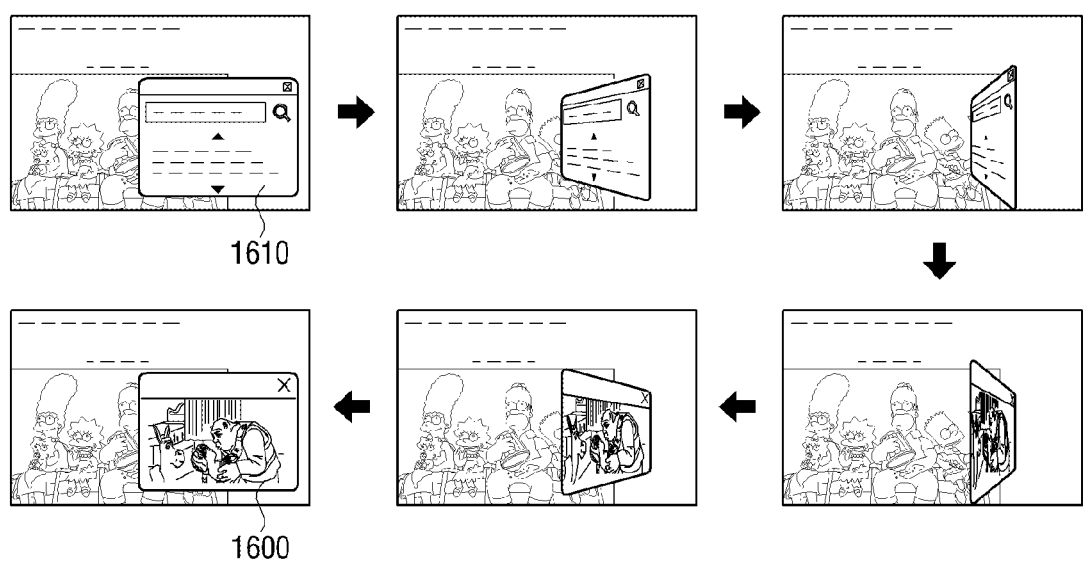

FIGS. 16A to 16C are views illustrating an animation effect of a process of converting between the search window and the image display window according to an exemplary embodiment.

The description of FIGS. 16A to 16C is made with reference to a case where the display apparatus 100 includes a touch screen function.

As shown in FIG. 16A, when a touch and drag operation is entered onto the image display window 1600 by the user, the display apparatus 100 converts the image display window 1600 into the search window 1610 as shown in FIG. 16B. Here, the touch and drag operation, which is one of the types of touch operations, is a touch operation in which the user rubs a touch surface in a given direction and then lifts the finger off the touch surface.

FIG. 16C is a view illustrating an animation effect of a process of converting the search window 1610 into the image display window 1600. As shown in FIG. 16C, the process of converting between the search window and the image display window 1600 may be performed with an animation effect as if a card is revolving.

As discussed above, the display apparatus 100 may convert between the search window 1610 and the image display window 1600.

Although the description of the present exemplary embodiment has been given of an example in which the display apparatus 100 includes the touch screen function, it is also possible to enter a command for conversion between the image display window 1600 and the search window 1610 through other user interfaces. For example, a touch screen or touch pad may be mounted in the remote control, and the user may enter a touch and drag operation using the touch screen or touch pad of the remote control.

Moreover, the remote control may include a pointing function. That is, the remote control may include a user interface function for pointing a specific point of the screen of the display apparatus 100. To implement this function, the remote control may comprise a Gyro sensor and an acceleration sensor. In this case, the touch and drag of a touch operation, corresponds to the point and drag of a pointing operation. Therefore, when a point and drag operation is entered through the remote control, the display apparatus 100 recognizes this as a command for conversion between the image display window 1600 and the search window 1610.

While an application screen displayed for search has been referred to as a search window in this exemplary embodiment, the use of this term is only for purposes of convenience, and is not limited to the form of a window.

Although the exemplary embodiments have been described supposing that the display apparatus is a TV, any device may be applied as the display apparatus if only it is capable of performing an Internet search function. For example, the exemplary embodiment may also be applied to a case in which the display apparatus is a mobile communication device such as a handheld phone, a personal music player (PMP), an MP3 player, etc.

The above-described embodiments can also be embodied as computer readable codes which are stored on a computer readable recording medium (for example, non-transitory, or transitory) and executed by a computer or processor. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the embodiments can be easily construed by programmers skilled in the art to which the disclosure pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

According to various exemplary embodiments, a search window for doing an internet search is displayed on a partial area of the screen that displays an image, and the search window can be converted into an image display window upon receipt of a specific manipulation input by a user, thereby allowing the user to use the search service while converting between the use of the search window and video watching.

Particularly, by displaying the search window, which has been displayed in a small size, in full screen, the small search window is automatically converted into the image display window, thereby allowing the user to watch video even if the search window is enlarged.

Although exemplary embodiments have been illustrated and described, those skilled in the art will appreciate that various changes and modifications may be made to the exemplary embodiment without departing from the technical spirit and scope of the inventive concept.

What is claimed is:

1. A method for providing a search service, the method comprising:
    displaying a broadcasting program;
    in response to receiving a command for displaying a search window, displaying the search window along with the broadcasting program;
    in response to receiving a command for inputting characters, displaying the characters in the search window;
    in response to receiving a search command, displaying a first predetermined number of search results corresponding to the characters in the search window;
    in response to receiving a command for turning a page of search results, turning the page of search results; and
    in response to receiving the command for turning the page of the search results more than a preset number of times, enlarging a size of the search window and displaying a second predetermined number of search results corresponding to the characters.

2. The method for providing the search service of claim 1, wherein the displaying the first and second predetermined number of search results display the first and second predetermined number of search results in a picture-in-picture (PIP) format on the broadcasting program.

3. The method for providing the search service of claim 1, further comprising:
    in response to a command to change a size of the search window to be greater than a half of a screen size, displaying the search window in a full screen.

4. The method for providing the search service of claim 3, wherein the command to change the size of the search window to be greater than a half of the screen size corresponds to a user's dragging a change-size-icon such that a dragged size of the search window is greater than the half of the screen size.

5. The method for providing the search service of claim 3, further comprising:
    in response to a command to change a size of the search window, determining whether a changed size of the search window is greater or less than the half of the screen size; and
    in response to determining that the changed size of the search window is greater than the half of the screen size, displaying the search window in a full screen.

6. The method for providing the search service of claim 3, further comprising:
    in response to a command to change a size of the search window, determining whether a changed size of the search window is greater or less than the half of the screen size; and in response to determining that the changed size of the search window is less than the half of the screen size, displaying the search window in the changed size.

7. The method for providing the search service of claim 1, further comprising:
enlarging a size of the search window according to a number of times a command for browsing at least one search result is input.

8. The method for providing the search service of claim 7, further comprising:
in response to a command to display another search result, other than the at least one of search result, being input more than a predetermined number of times, enlarging a size of the search window.

9. The method for providing the search service of claim 8, wherein the predetermined number of times is equal to or greater than one, and the same command is repeatedly input more than the predetermined number of times.

10. An apparatus comprising:
a display configured to display a broadcasting program; and
a controller configured to:
control the display to display a search window along with the broadcasting program, in response to receiving a command for displaying the search window,
control the display to display characters in the search window, in response to receiving a command for inputting the characters,
control the display to display a first predetermined number of search results corresponding to the characters in the search window, in response to receiving a search command,
control the display to turn a page of search results, in response to receiving a command for turning the page of search results, and
control the display to enlarge a size of the search window and display a second predetermined number of search results corresponding to the characters, in response to receiving the command for turning the page of the search results more than a preset number of times.

11. The apparatus of claim 10, wherein the controller is configured to display the first and second predetermined number of search results in a picture-in-picture (PIP) format on the broadcasting program.

12. The apparatus of claim 10, wherein the controller is further configured to control the display to display the search window in a full screen, in response to a command to change a size of the search window to be greater than a half of the screen size.

13. The apparatus of claim 12, wherein the controller is further configured to determine whether a changed size of the search window is greater or less than the half of the screen size in response to a command to change a size of the search window, and control the display to display the search window in the changed size in response to determining that the changed size of the search window is less than the half of the screen size.

14. The apparatus of claim 10, wherein the controller is further configured to enlarge a size of the search window according to a number of times a command for browsing at least one search result is input.

15. The apparatus of claim 14, wherein the controller is further configured to enlarge a size of the search window in response to a command to display another search result, other than the at least one of search result, being input more than a predetermined number of times.

16. A method for providing a search service, the method comprising:
receiving a broadcasting program;
receiving a manipulation input by a user in order to display a search window along with a displayed broadcasting program and characters input by the user in the search window;
in response to receiving a search command, outputting a first predetermined number of search results corresponding to the characters;
in response to receiving a command for turning a page of search results, turning the page of search results; and
in response to receiving the command for turning the page of the search results more than a preset number of times, enlarging a size of the search window and displaying a second predetermined number of search results corresponding to the characters.

17. The method for providing the search service of claim 16, further comprising;
displaying selected search result along with the broadcasting program.

18. The method for providing the search service of claim 17, wherein the selected search result is configured to display in a picture-in-picture (PIP) format on the broadcasting program.

* * * * *